(12) United States Patent
Nordseth et al.

(10) Patent No.: US 11,262,460 B2
(45) Date of Patent: *Mar. 1, 2022

(54) METHODS AND SYSTEM FOR THERMO-OPTIC POWER MONITORING

(71) Applicant: Phoseon Technology, Inc., Hillsboro, OR (US)

(72) Inventors: Gary Nordseth, Beaverton, OR (US); Garth Eliason, Hood River, OR (US); Gordon Neumann, Portland, OR (US); Gary Till, Newberg, OR (US); Gary McKenzie, Wilsonville, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,503

(22) Filed: Dec. 14, 2020

(65) Prior Publication Data

US 2021/0096269 A1 Apr. 1, 2021

Related U.S. Application Data

(63) Continuation of application No. 16/559,498, filed on Sep. 3, 2019, now Pat. No. 10,895,649.

(60) Provisional application No. 62/734,182, filed on Sep. 20, 2018.

(51) Int. Cl.
  *G01T 1/16* (2006.01)
  *G01J 3/10* (2006.01)
  *H05B 45/22* (2020.01)
  *H05B 45/40* (2020.01)

(52) U.S. Cl.
  CPC .................. *G01T 1/16* (2013.01); *G01J 3/10* (2013.01); *H05B 45/22* (2020.01); *H05B 45/40* (2020.01)

(58) Field of Classification Search
  CPC . G01T 1/16; H05B 45/40; H05B 45/22; G01J 3/10
  See application file for complete search history.

(56) References Cited

U.S. PATENT DOCUMENTS

| | | | | |
|---|---|---|---|---|
| 7,816,638 B2* | 10/2010 | Olson | .................... | H05B 45/46 250/214.1 |
| 8,039,785 B2* | 10/2011 | Olson | .................... | H05B 45/12 250/214.1 |
| 8,330,377 B2 | 12/2012 | Marson | | |
| 8,872,137 B2 | 10/2014 | Childers | | |
| 9,304,273 B2 | 4/2016 | Childers | | |
| 9,346,288 B2 | 5/2016 | Childers | | |
| 9,357,592 B2 | 5/2016 | Basauri | | |

(Continued)

*Primary Examiner* — Mary Ellen Bowman
(74) *Attorney, Agent, or Firm* — McCoy Russell LLP

(57) ABSTRACT

A radiation monitor for a lighting device, and operating methods and systems therefor are provided. In one example, a radiation monitor may include a first sensor receiving radiation output directly from a light-emitting element of the lighting device and radiation output from external sources; and a second sensor receiving the radiation output from the external sources without receiving the radiation output directly from the light-emitting element of the lighting device. The radiation monitor may determine an intensity of the radiation output directly from the light-emitting element based on a difference in the output signals from the first sensor and the second sensor.

20 Claims, 12 Drawing Sheets

(56) References Cited

U.S. PATENT DOCUMENTS

| | | | |
|---|---|---|---|
| 9,442,007 B2* | 9/2016 | Childers | G01J 1/429 |
| 9,616,679 B2 | 4/2017 | Childers | |
| 9,764,049 B2* | 9/2017 | Eliason | A61B 50/00 |
| 10,091,852 B2* | 10/2018 | Eliason | H05B 45/345 |
| 2006/0249663 A1* | 11/2006 | Ewig | B60Q 11/00 |
| | | | 250/221 |

* cited by examiner

FIG. 7
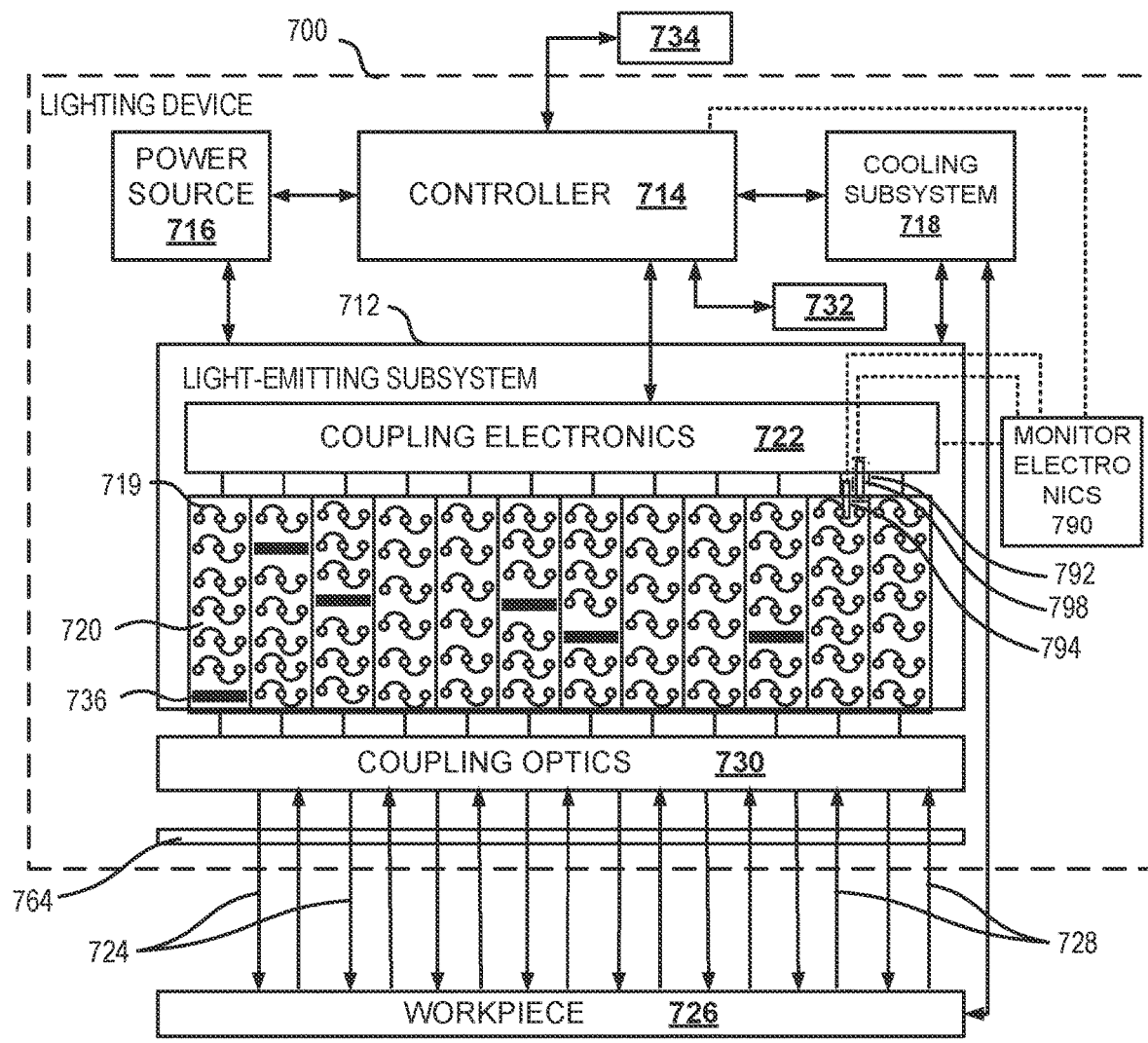
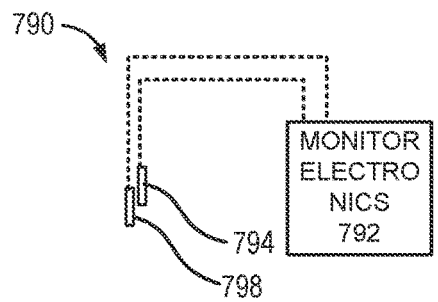

FIG. 10
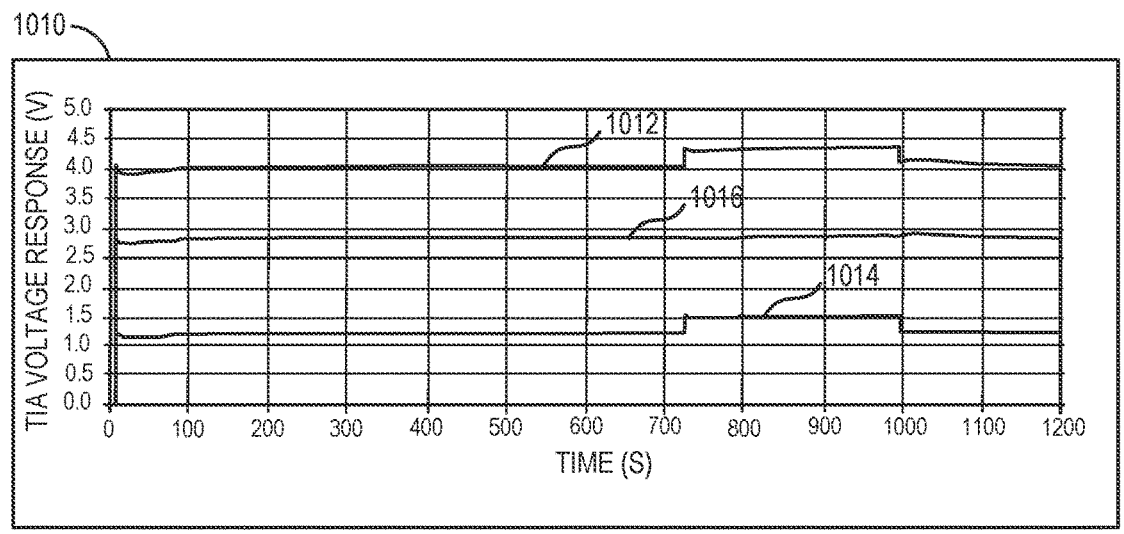
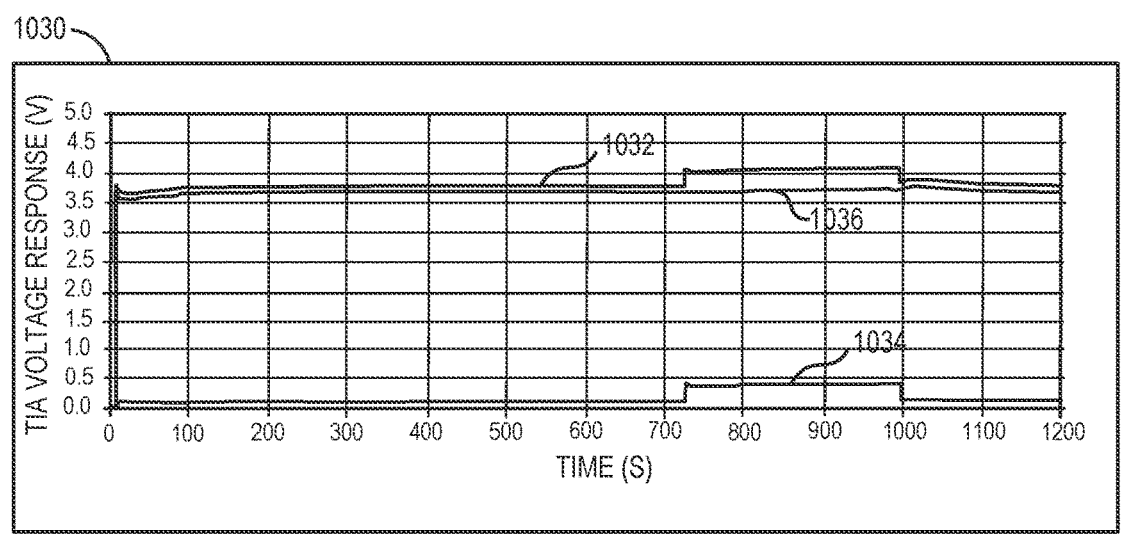
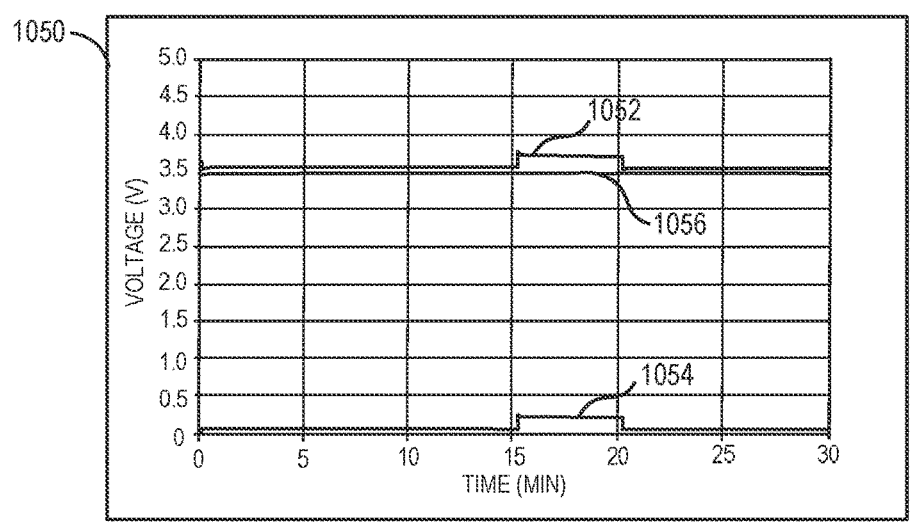

METHODS AND SYSTEM FOR THERMO-OPTIC POWER MONITORING

CROSS REFERENCE TO RELATED APPLICATIONS

The present application is a continuation of U.S. Non-Provisional patent application Ser. No. 16/559,498, entitled "METHODS AND SYSTEM FOR THERMO-OPTIC POWER MONITORING", and filed on Sep. 3, 2019. U.S. Non-Provisional application Ser. No. 16/559,498 claims priority to U.S. Provisional Application No. 62/734,182, entitled "METHODS AND SYSTEM FOR THERMO-OPTIC POWER MONITORING", and filed on Sep. 20, 2018. The entire contents of each of the above-listed applications are hereby incorporated by reference for all purposes.

BACKGROUND AND SUMMARY

Accurate monitoring of lighting devices can be difficult because of extraneous light or radiation from external sources, including light output from the lighting device that is retro-reflected back towards the lighting device. Owing to this incident radiation from external sources, photosensors in a conventional lighting device can indicate higher radiation levels than what is actually output from the lighting device. In cases where the lighting device emits polarized light, retro-reflected radiation incident at the lighting device can be mitigated by employing a beam-splitter or a prism, and obtaining an unperturbed fractional measurement of the incident light. In the absence of polarization, paired identical light sources can be used to enable an indirect measurement of the light output; with one of the light sources spatially separated from the other and provided with an environment isolated from external light sources.

The inventors herein have recognized potential issues with the above approach. Namely, accuracy and reliability of radiation monitoring of more commonplace non-polarized incoherent light sources such as LED or incandescent light sources can be increased. In particular, employing paired light sources can be highly variable because the ratio of light from multiple sources must remain constant over time and ambient conditions, which often change. Furthermore, paired light sources increases a system complexity and cost since multiple light sources are employed and monitored.

One approach that at least partially addresses the above issues includes a radiation monitor for a lighting device, comprising a first sensor receiving radiation output directly from a light-emitting element of the lighting device and radiation output from external sources, a second sensor receiving the radiation output from the external sources without receiving the radiation output directly from the light-emitting element of the lighting device, and electronic circuitry receiving output signals from the first sensor and the second sensor and determining an intensity of the radiation output directly from the light-emitting element based on a difference in the output signals from the first sensor and the second sensor.

In this manner, the technical result of accurate and reliable monitoring of a light source is provided. In particular, the influence of incident radiation arising from external sources including retro-reflected radiation, is removed by subtracting its contribution from the measured radiation. Furthermore, the radiation monitor can be implemented and customized to a particular lighting device or application by utilizing different types of radiation sensors. Further still, the radiation monitoring is provided without paired light sources. In this way, costs and complexity of the radiation monitor can be reduced, while increasing its reliability and accuracy as compared with conventional devices.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 is a schematic illustrating an example of a lighting system, including a lighting device such as the lighting device of FIG. 2 or FIG. 4, and a radiation monitor such as the radiation monitors of FIG. 2 or FIG. 4, respectively.

FIG. 10 shows voltage response plots for operating a radiation monitor such as the radiation monitors of FIG. 2 or FIG. 4.

DETAILED DESCRIPTION

Figure 1:
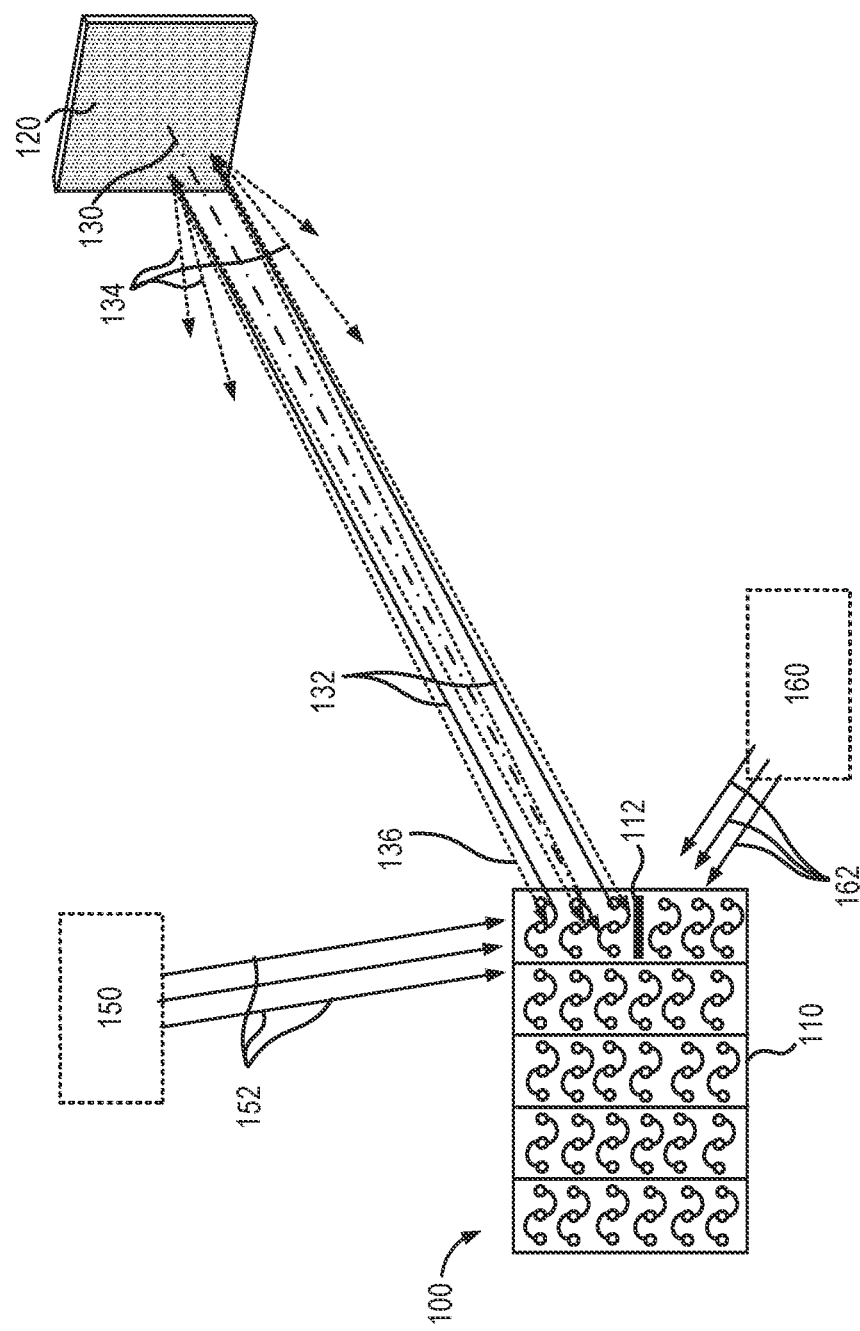
FIG. 1 is a schematic illustrating a lighting device exposed to radiation from external sources, including retro-reflected radiation.
Figure 3:
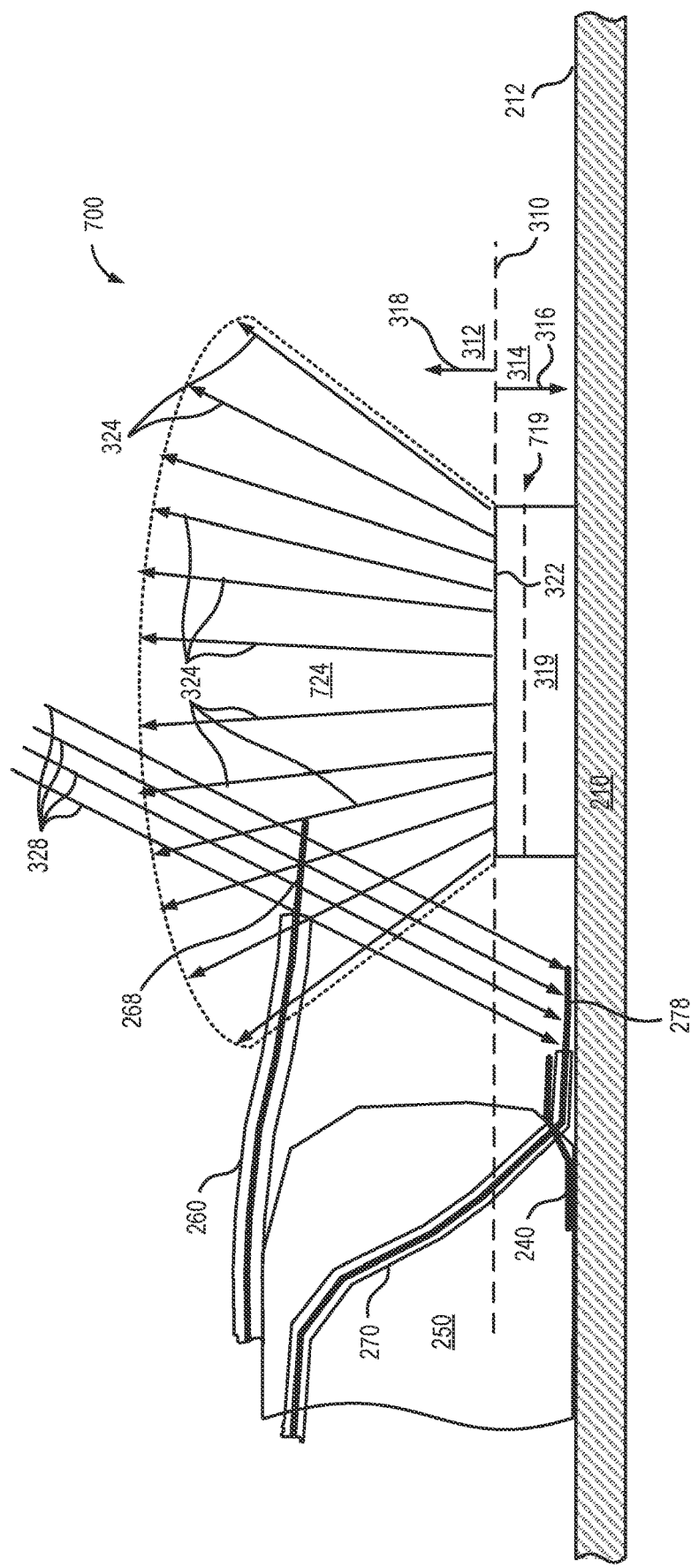
FIG. 3 is a partial cross-sectional view of the lighting device and the sensors of the radiation monitor to monitor output of the lighting device of FIG. 2.
Figure 4:
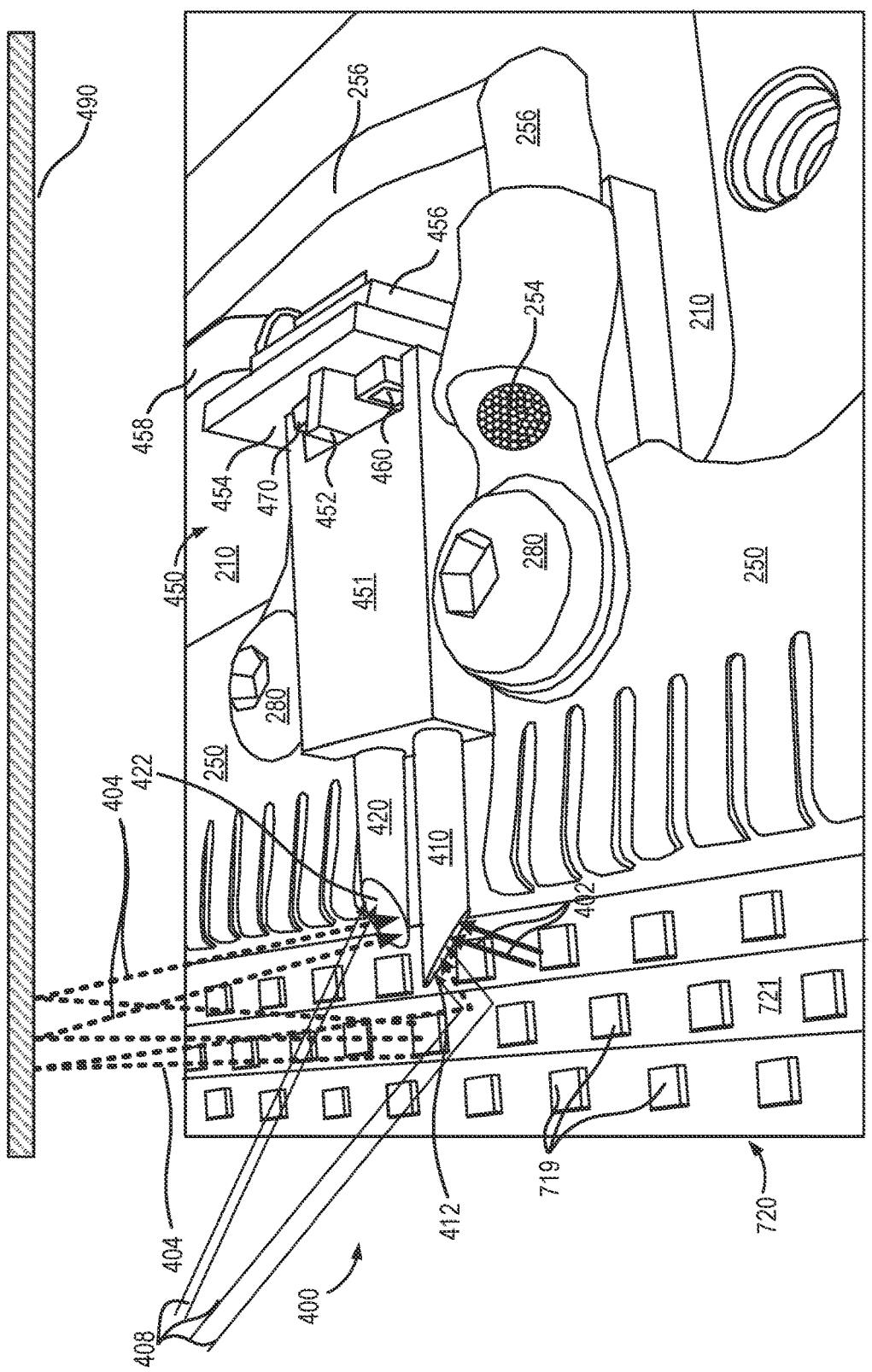
FIG. 4 is a partial perspective view of a second example of a lighting device and sensors of a radiation monitor to monitor output of the lighting device.
Figure 5:
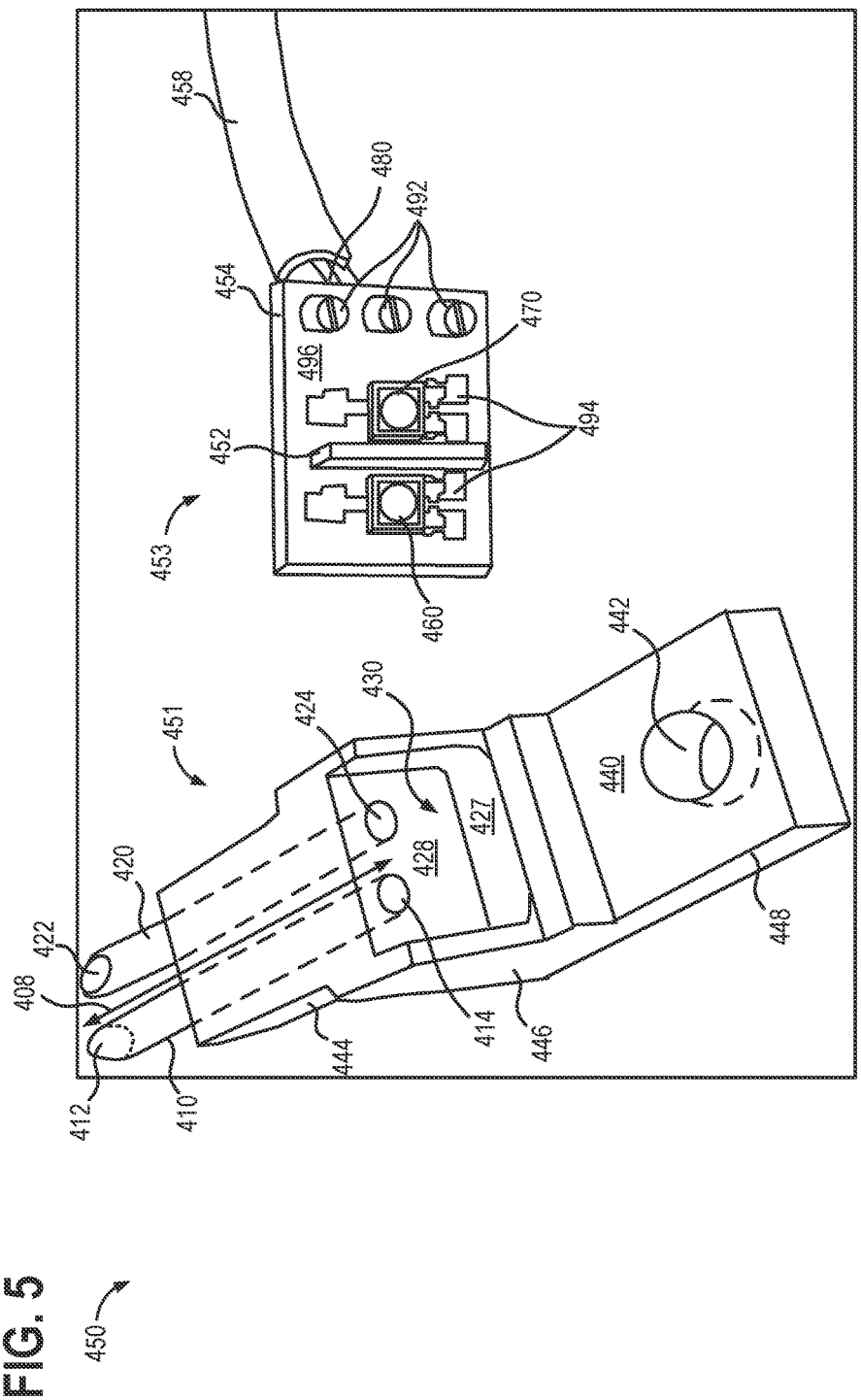
FIG. 5 is a perspective view of a sensor mounting block and the sensors of the radiation monitor to monitor output of the lighting device of FIG. 4.
Figure 6:
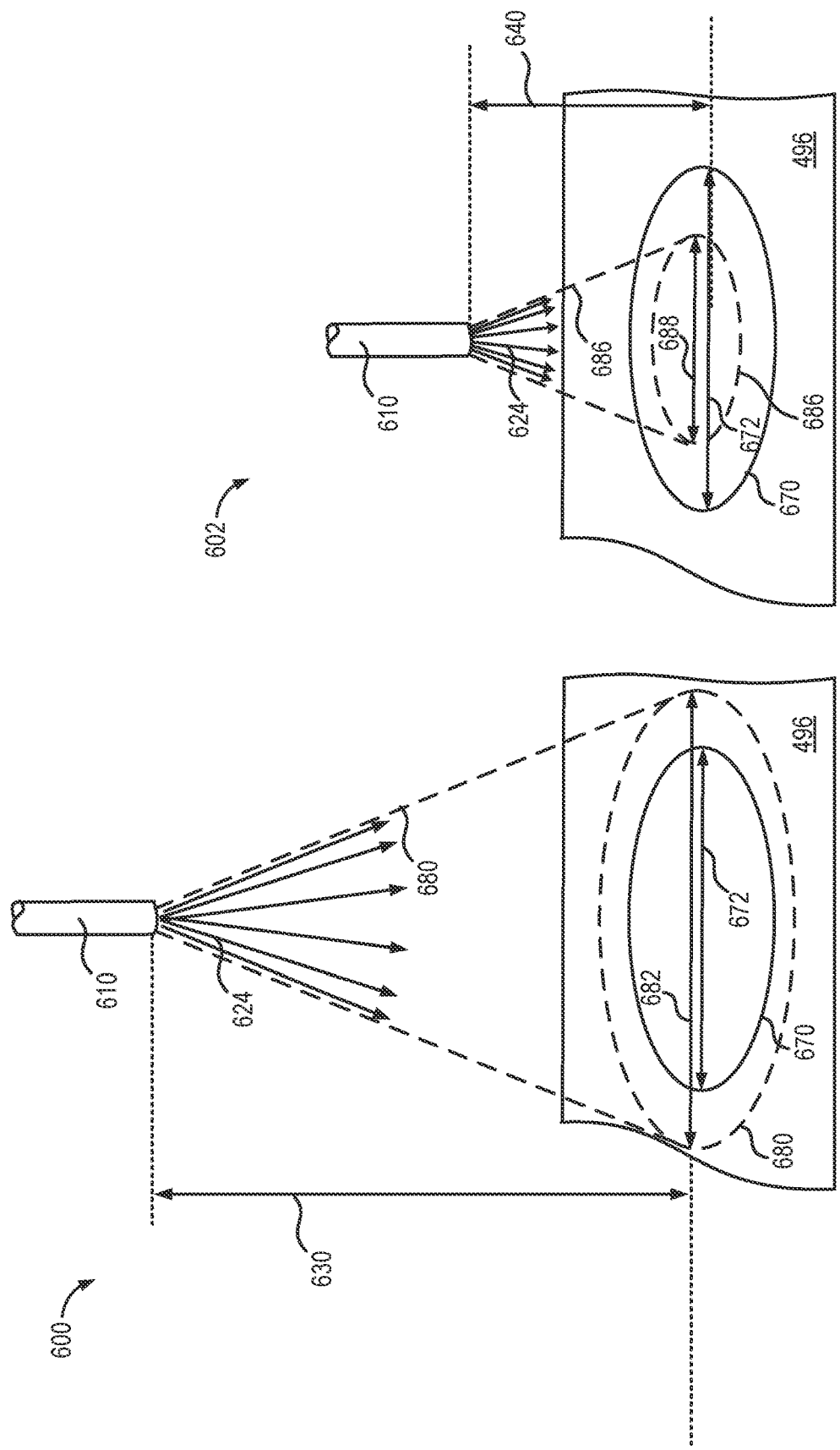
FIG. 6 illustrates over-filled and under-filled conditions when positioning a sensor of the radiation monitor to monitor output of the lighting device of FIG. 4.
Figure 11:
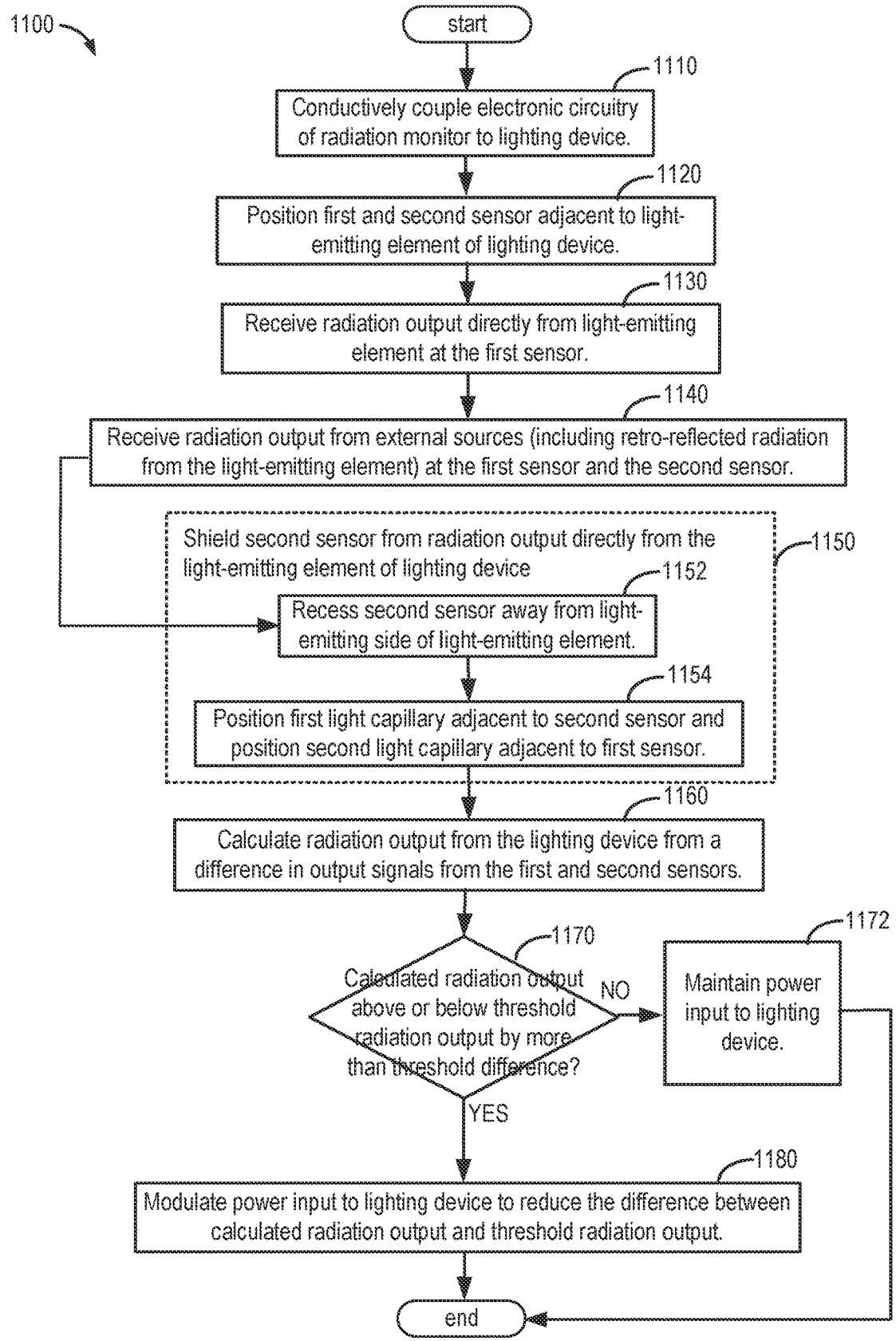
FIG. 11 is an example flow chart of a method for thermo-optic power monitoring a lighting device utilizing a radiation monitor such as the radiation monitors of FIG. 2 or FIG. 4.
Figure 12:
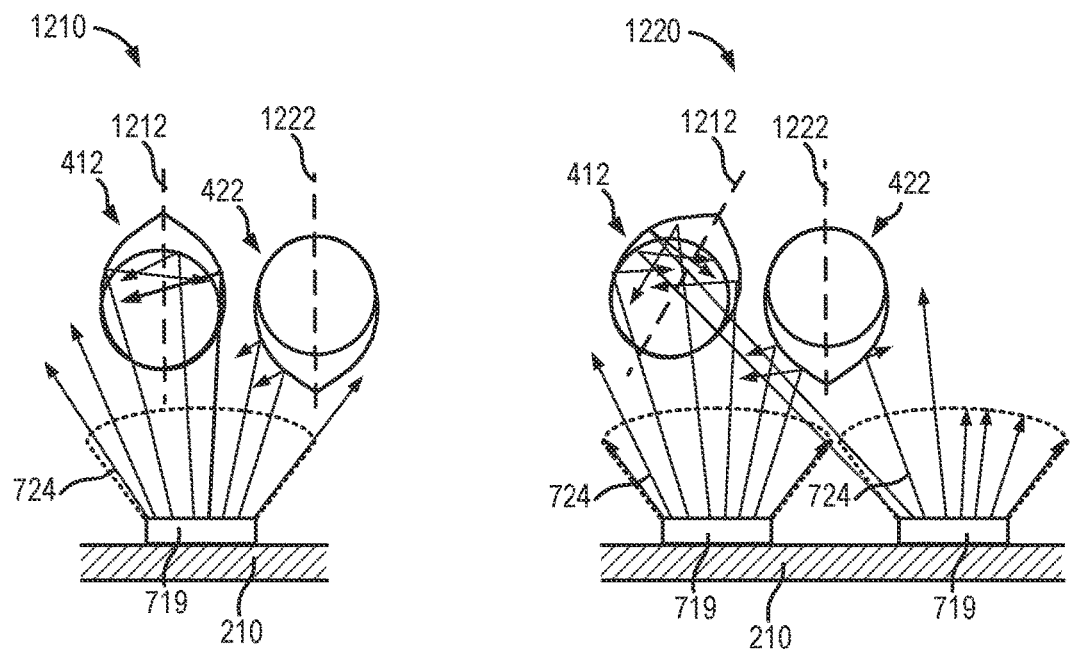
FIG. 12 is partial cross-sectional view of a radiation monitor and a lighting device such as the radiation monitors and lighting devices of FIG. 4.
Figure 13:
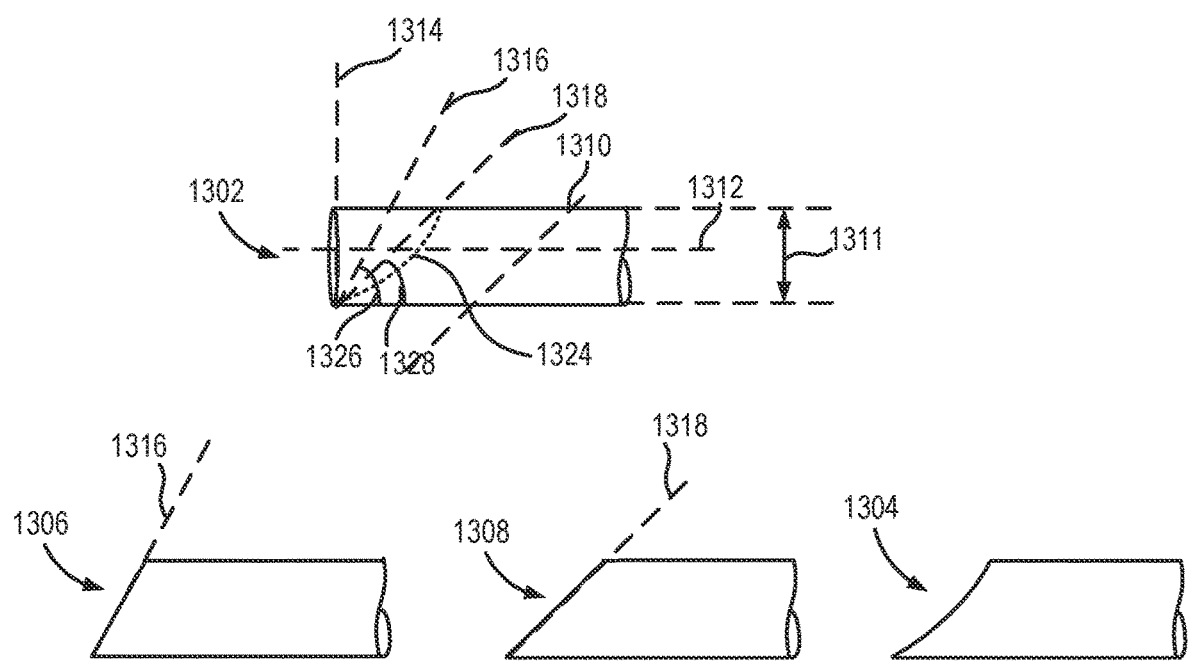
FIG. 13 is a partial cross-sectional view illustrating various types of light capillaries.

The present description relates to a radiation monitor, and methods and systems of radiation monitoring, which increase reliability and accuracy relative to conventional systems and methods by subtracting incident radiation from external sources, including retro-reflected radiation. FIG. 1 illustrates how retro-reflective surfaces and retro-reflected radiation can direct extraneous light back to a lighting device. A radiation monitor, such as the example apparatus shown in FIGS. 2-3, may remove retro-reflected radiation, as well as other radiation from external sources, from a measured output of a lighting device. A further example of a radiation monitor that may remove retro-reflected radiation and other radiation from external sources from a measured output of a lighting device is illustrated in FIGS. 4-6. The radiation monitor of FIGS. 4-6 may employ light capillaries, as illustrated in FIG. 12 and FIG. 13. FIG. 7 illustrates a system including a lighting device integrated with a radiation monitor, such as the radiation monitors of FIGS. 2-6. The radiation monitors of FIGS. 2-6 may be operated according to the electronic circuit diagrams depicted in FIGS. 7-8. Removal of the retro-reflected radiation and other radiation from external sources from a measured output of a lighting device during operation of the radiation monitors is illustrated by the plots in FIG. 10. Furthermore a method of operating a radiation monitor and/or a system including a radiation monitor and a lighting device is illustrated in FIG. 11.

Turning now to FIG. 1, it illustrates a schematic showing a lighting device 100, including an array of light-emitting elements 110, and a photosensor 112. Photosensor 112 may be able to detect radiation output directly from the array of light-emitting elements 110. Light radiation 132 is emitted from the array of light-emitting elements 110 parallel to an axis 130 on to a reflective surface 120. Reflective surface 120 may include portions which exhibit retro-reflective properties such that incident light radiation 132 may be retro-reflected as retro-reflected radiation 134. Retro-reflected radiation 134 may include retro-reflected radiation 136 that is reflected back on to the array of light-emitting elements 110 and detected by the photosensor 112. Furthermore, radiation 152 and 162 emitted from external sources 150 and 160 respectively, may be incident at the array of light-emitting elements 110 and detected by the photosensor 112. Non-limiting examples of external sources 150 and 160 may include radiation from sources other than the radiation output directly from the lighting device such as stray light, radiation emitted from other lighting devices, retro-reflected light, and the like.

Accordingly, the total radiation measured by photosensor 112 may include radiation output directly from the array of light-emitting elements 112, retro-reflected radiation 134, and radiation 152 and 162 output from other external sources 150 and 160. As such, the photosensor 112 may detect and measure an increased radiation level higher than the actual radiation intensity or power output from the lighting device. For the case where the photosensor measurement is input to a controller for the lighting device 100, the exaggerated measurement of the actual radiation intensity can lead to improper operation of the lighting device because the output radiation may not match a target or threshold radiation intensity. In other words, the radiation output from external sources (150, 160, and retro-reflected radiation 134) may act as noise obscuring measurement of a primary signal corresponding to the radiation 132 emitted directly from the lighting device 100. Reducing incident radiation from these external sources at the photosensor 112 can thus aid in increasing the signal-to-noise ratio, thereby increasing a reliability and accuracy of the photosensor 112.

Referring now to FIG. 7, it illustrates a block diagram for an example configuration of a lighting device 700. In one example, lighting device 700 may comprise a light-emitting subsystem 712, a controller 714, a power source 716 and a cooling subsystem 718. The light-emitting subsystem 712 may comprise a plurality of semiconductor devices 719. The plurality of semiconductor devices 719 may include a linear or two-dimensional array 720 of light-emitting elements such as an array of LED devices, for example. Semiconductor devices may provide radiant output 724, including one or more of visible light, ultra-violet (UV) light, and infrared (IR) radiation. The radiant output 724 may be directed to a workpiece 726 located at a fixed plane from lighting device 700. Returned radiation 728 may be retro-reflected back to the light-emitting subsystem 712 from the workpiece 726 (e.g., via reflection of the radiant output 724). In some examples, the workpiece 726 may include a retro-reflective surface.

The radiant output 724 may be directed to the workpiece 726 via coupling optics 730. The coupling optics 730, if used, may be variously implemented. As an example, the coupling optics may include one or more layers, materials or other structures interposed between the semiconductor devices 719 and workpiece 726, and providing radiant output 724 to surfaces of the workpiece 726. As an example, the coupling optics 730 may include a micro-lens array to enhance collection, condensing, collimation or otherwise the quality or effective quantity of the radiant output 724. As another example, the coupling optics 730 may include a micro-reflector array. In employing such a micro-reflector array, each semiconductor device providing radiant output 724 may be disposed in a respective micro-reflector, on a one-to-one basis. As another example, a linear array of semiconductor devices 720 providing radiant output 724 may be disposed in macro-reflectors, on a many-to-one basis. In this manner, coupling optics 730 may include both micro-reflector arrays, wherein each semiconductor device is disposed on a one-to-one basis in a respective micro-reflector, and macro-reflectors wherein the quantity and/or quality of the radiant output 724 from the semiconductor devices is further enhanced by macro-reflectors. Lighting device 700 may further include a transparent window 764 interposed between the coupling optics 730 and the workpiece 726.

Each of the layers, materials or other structure of coupling optics 730 may have a selected index of refraction. By properly selecting each index of refraction, reflection at interfaces between layers, materials and other structures in the path of the radiant output 724 (and/or retro-reflected radiation 728) may be selectively controlled. As an example, by controlling differences in such indexes of refraction at a selected interface, for example window 764, disposed between the semiconductor devices to the workpiece 726, reflection at that interface may be reduced or increased so as to enhance the transmission of radiant output at that interface for ultimate delivery to the workpiece 726. For example, the coupling optics may include a dichroic reflector where certain wavelengths of incident light are absorbed, while others are reflected and focused to the surface of workpiece 726.

The coupling optics 730 may be employed for various purposes. Example purposes include, among others, to protect the semiconductor devices 719, to retain cooling fluid associated with the cooling subsystem 718, to collect, condense and/or collimate the radiant output 724, to collect, direct or reject retro-reflected radiation 728, or for other purposes, alone or in combination. As a further example, the lighting device 700 may employ coupling optics 730 so as to enhance the effective quality, uniformity, or quantity of the radiant output 724, particularly as delivered to the workpiece 726.

As a further example, coupling optics 730 may comprise a cylindrical lens through which light emitted from the linear array of light-emitting elements is directed. As previously described, light emitted from the linear array of light-emitting elements may be incident at an incident face of the cylindrical lens, and may be collimated and redirected out of an emitting face of the cylindrical lens. The cylindrical lens may include one or more of a rod lens, a semi-circular lens, a plano-convex lens, a bi-convex lens, and a faceted Fresnel lens. The cylindrical lens may include a cylindrical lens having a cylindrical power axis and an orthogonal plano axis, for collimating and/or focusing the light emitted from the linear array 720 of semiconductor devices 719.

Selected of the plurality of semiconductor devices 719 may be coupled to the controller 714 via coupling electronics 722, so as to provide data to the controller 714. As described further below, the controller 714 may also be implemented to control such data-providing semiconductor devices, e.g., via the coupling electronics 722. The controller 714 may be connected to, and may be implemented to control, the power source 716, and the cooling subsystem 718. Moreover, the controller 714 may receive data from power source 716 and cooling subsystem 718. In one example, the irradiance at one or more locations at the workpiece 726 surface may be detected by sensors and transmitted to controller 714 in a feedback control scheme. In a further example, controller 714 may communicate with a controller of another lighting system (not shown in FIG. 7) to coordinate control of both lighting systems. For example, controller 714 of multiple lighting systems may operate in a master-slave cascading control algorithm, where the set point of one of the controllers is set by the output of the other controller. Other control strategies for operation of lighting system 10 in conjunction with another lighting system may also be used. As another example, controller 714 for multiple lighting systems arranged side by side may control lighting systems in an identical manner for increasing uniformity of irradiated light across multiple lighting systems.

In addition to the power source 716, cooling subsystem 718, and light-emitting subsystem 712, the controller 714 may also be connected to, and implemented to control internal element 732, and external element 734. Element 732, as shown, may be internal to the lighting device 700, while element 734, as shown, may be external to the lighting device 700, but may be associated with the workpiece 726 (e.g., handling, cooling or other external equipment) or may be otherwise related to a photoreaction (e.g. curing) that lighting device 700 supports.

The data received by the controller 714 from one or more of the power source 716, the cooling subsystem 718, the light-emitting subsystem 712, and/or elements 732 and 734, may be of various types. As an example, the data may be representative of one or more characteristics associated with coupled semiconductor devices 719. As another example, the data may be representative of one or more characteristics associated with the respective light-emitting subsystem 712, power source 716, cooling subsystem 718, internal element 732, and external element 734 providing the data. As still another example, the data may be representative of one or more characteristics associated with the workpiece 726 (e.g., representative of the radiant output energy or spectral component(s) directed to the workpiece). Moreover, the data may be representative of some combination of these characteristics.

The controller 714, in receipt of any such data, may be implemented to respond to that data. For example, responsive to such data from any such component, the controller 714 may be implemented to control one or more of the power source 716, cooling subsystem 718, light-emitting subsystem 712 (including one or more such coupled semiconductor devices), and/or the elements 32 and 34. As an example, responsive to data from the light-emitting subsystem indicating that the light energy is insufficient at one or more points associated with the workpiece, the controller 714 may be implemented to either (a) increase the power source's supply of power to one or more of the semiconductor devices, (b) increase cooling of the light-emitting subsystem via the cooling subsystem 718 (e.g., certain light-emitting devices, if cooled, provide greater radiant output), (c) increase the time during which the power is supplied to such devices, or (d) a combination of the above.

Individual semiconductor devices 719 (e.g., LED devices) of the light-emitting subsystem 712 may be controlled independently by controller 714. For example, controller 714 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same linear array 720 of semiconductor devices, or may be from more than one linear array of semiconductor devices 720 from multiple lighting devices 700. Linear array 720 of semiconductor device may also be controlled independently by controller 714 from other linear arrays of semiconductor devices in other lighting systems. For example, the semiconductor devices of a first linear array may be controlled to emit light of a first intensity, wavelength, and the like, while those of a second linear array in another lighting system may be controlled to emit light of a second intensity, wavelength, and the like.

As a further example, under a first set of conditions (e.g. for a specific workpiece, photoreaction, and/or set of operating conditions) controller 714 may operate lighting device 700 to implement a first control strategy, whereas under a second set of conditions (e.g. for a specific workpiece, photoreaction, and/or set of operating conditions) controller 714 may operate lighting device 700 to implement a second control strategy. As described above, the first control strategy may include operating a first group of one or more individual semiconductor devices (e.g., LED devices) to emit light of a first intensity, wavelength, and the like, while the second control strategy may include operating a second group of one or more individual LED devices to emit light of a second intensity, wavelength, and the like. The first group of LED devices may be the same group of LED devices as the second group, and may span one or more arrays of LED devices, or may be a different group of LED devices from the second group, but the different group of LED devices may include a subset of one or more LED devices from the second group.

The cooling subsystem 718 may be implemented to manage the thermal behavior of the light-emitting subsystem 712. For example, the cooling subsystem 718 may provide for cooling of light-emitting subsystem 712, and more specifically, the semiconductor devices 719. The cooling subsystem 718 may also be implemented to cool the workpiece 726 and/or the space between the workpiece 726 and the lighting device 700 (e.g., the light-emitting subsystem 712). For example, cooling subsystem 718 may comprise an air or other fluid (e.g., water) cooling system. Cooling subsystem 718 may also include cooling elements such as cooling fins attached to the semiconductor devices 719, or linear array 720 thereof, or to the coupling optics 730. For example, cooling subsystem may include blowing cooling air over the coupling optics 730, wherein the coupling optics 730 are equipped with external fins to enhance heat transfer.

The lighting device 700 may be used for various applications. Examples include, without limitation, curing applications ranging from displays, photoactive adhesives, and ink printing to the fabrication of DVDs and lithography. The applications in which the lighting device 700 may be employed can have associated operating parameters. That is, an application may have associated operating parameters as follows: provision of one or more levels of radiant power, at one or more wavelengths, applied over one or more periods of time. In order to properly accomplish the photoreaction associated with the application, optical power may be delivered at or near the workpiece 726 at or above one or more predetermined levels of one or a plurality of these parameters (and/or for a certain time, times or range of times).

In order to follow an intended application's parameters, the semiconductor devices 719 providing radiant output 724 may be operated in accordance with various characteristics associated with the application's parameters, e.g., temperature, spectral distribution and radiant power. At the same time, the semiconductor devices 719 may have certain operating specifications, which may be associated with the semiconductor devices' fabrication and, among other things, may be followed in order to preclude destruction and/or forestall degradation of the devices. Other components of the lighting device 700 may also have associated operating specifications. These specifications may include ranges (e.g., maximum and minimum) for operating temperatures and applied electrical power, among other parameter specifications.

Accordingly, the lighting device 700 may support monitoring of the application's parameters. In addition, the lighting device 700 may provide for monitoring of semiconductor devices 719, including their respective characteristics and specifications. Moreover, the lighting device 700 may also provide for monitoring of selected other components of the lighting device 700, including its characteristics and specifications.

Providing such monitoring may enable verification of the system's proper operation so that operation of lighting device 700 may be reliably evaluated. For example, lighting device 700 may be operating improperly with respect to one or more of the application's parameters (e.g. temperature, spectral distribution, radiant power, and the like), any component's characteristics associated with such parameters and/or any component's respective operating specifications. The provision of monitoring may be responsive and carried out in accordance with the data received by the controller 714 from one or more of the system's components.

Monitoring may also support control of the system's operation. For example, a control strategy may be implemented via the controller 714, the controller 714 receiving and being responsive to data from one or more system components. This control strategy, as described above, may be implemented directly (e.g., by controlling a component through control signals directed to the component, based on data respecting that components operation) or indirectly (e.g., by controlling a component's operation through control signals directed to adjust operation of other components). As an example, a semiconductor device's radiant output may be adjusted indirectly through control signals directed to the power source 716 that adjust power applied to the light-emitting subsystem 712 and/or through control signals directed to the cooling subsystem 718 that adjust cooling applied to the light-emitting subsystem 712.

Control strategies may be employed to enable and/or enhance the system's proper operation and/or performance of the application. In one example, the irradiance at one or more locations at the workpiece 726 surface may be detected by sensors and transmitted to controller 714 in a feedback control scheme.

In some applications, high radiant power may be delivered to the workpiece 726. Accordingly, the light-emitting subsystem 712 may be implemented using an array of light-emitting semiconductor devices 720. For example, the light-emitting subsystem 712 may be implemented using a high-density, light-emitting diode (LED) array. Although linear array of light-emitting elements may be used and are described in detail herein, it is understood that the semiconductor devices 719, and linear arrays 720 thereof, may be implemented using other light-emitting technologies without departing from the principles of the invention; examples of other light-emitting technologies include, without limitation, organic LEDs, laser diodes, other semiconductor lasers.

Continuing with FIG. 7, the plurality of semiconductor devices 719 may be provided in the form of one or more arrays 720, or an array of arrays (e.g., as shown in FIG. 7). The arrays 720 may be implemented so that one or more, or most of the semiconductor devices 719 are configured to provide radiant output. At the same time, however, one or more of the array's semiconductor devices 719 may be implemented so as to provide for monitoring selected of the array's characteristics. One or more monitoring devices 736 may be selected from among the devices in the array and, for example, may have the same structure as the other, emitting devices. For example, the difference between emitting and monitoring may be determined by the coupling electronics 722 associated with the particular semiconductor device (e.g., in a basic form, an LED array may have monitoring LED devices where the coupling electronics provides a reverse current, and emitting LED devices where the coupling electronics provides a forward current).

Furthermore, based on coupling electronics, selected of the semiconductor devices in the array may be either/both multifunction devices and/or multimode devices, where (a) multifunction devices may be capable of detecting more than one characteristic (e.g., either radiant output, temperature, magnetic fields, vibration, pressure, acceleration, and other mechanical forces or deformations) and may be switched among these detection functions in accordance with the application parameters or other determinative factors and (b) multimode devices may be capable of emission, detection and some other mode (e.g., off) and may be switched among modes in accordance with the application parameters or other determinative factors.

A radiation monitor 790, or radiation monitoring device, for monitoring radiation output by the lighting device 700 may include a first sensor 794, a second sensor 798 and monitor electronics 790. Furthermore, the radiation monitor 790 may include a radiation filter 792. In one example, the radiation filter 792 may comprise a device or structure coupled to the second sensor 798. In one example, the radiation filter 792 may be coupled directly to the second sensor; in other examples, the radiation filter 792 may be coupled indirectly with the second sensor. In other examples, the radiation filter may include a structure separate from the second sensor that, when taken in conjunction with positioning of the second sensor, serves as a spatial radiation filter to exclude the radiation output directly from the lighting device from reaching the second sensor while allowing radiation output from external sources to be received at the second sensor. In other words, the radiation filter 792 may shield the second sensor 798 from the radiation output directly from the light-emitting element while allowing the radiation from external sources to reach the second sensor, while the radiation output directly from the light-emitting element and the radiation from external sources are incident at the first sensor 794.

Examples of the radiation filter 792 may include a mounting means for positioning the second and/or first sensors, and light capillaries, as described below with reference to FIGS. 2-6. Furthermore, shielding the second sensor 798 from the radiation output directly from the light-emitting element while allowing the radiation from external sources to reach the second sensor may be implemented by one or more of positioning the second sensor 798 at a non-light-emitting side of a light-emitting plane of the light-emitting element 719, supporting the light-emitting element 719 on a base interposed between a printed circuit board of the lighting device 700 and the light-emitting element 719 to facilitate positioning the second sensor 798 at the non-light emitting side of the light-emitting plane of the light-emitting element 719, and coupling a light capillary to the second sensor 798.

As described below with reference to FIGS. 2-6, the first sensor 794 and the second sensor 798 may include thermocouples. In another example, the first sensor 794 and the second sensor 798 may include photodiodes. In other examples, first sensor 794 and the second sensor 798 may include another type of photosensor or radiation sensor. The radiation monitor 790 may be a standalone device (as shown at the bottom of FIG. 7), and may be retrofit to existing lighting devices for monitoring the power (or radiation intensity) output therefrom. Retrofitting the radiation monitor 790 with a lighting device 700 may include positioning the first sensor 794 and second sensor 798 adjacent to a light-emitting element of the lighting device 700. Further details regarding retrofitting a lighting device with the radiation monitor 790 are described previously with reference to FIGS. 2-6. Additionally, the radiation monitor 790 may be more closely integrated (as shown in FIG. 7) with a lighting device by conductively coupling the monitor electronics 790 with coupling electronics 722 and/or controller 714 of the lighting device. In this way, the lighting device operation may be modulated or controlled responsively to measurements from the radiation monitor 790, including responsively to signals from the first and second sensors 794 and 798 and monitor electronics 792. Non-limiting examples of retrofitting and/or integration of radiation monitor 790 with existing lighting devices is illustrated and described above with reference to FIGS. 2-6.

For example, if the radiation monitor 790 detects a radiation output directly from the lighting device that is greater than a threshold radiation output, the controller 714 may send a signal to the coupling electronics 722 of the lighting device 700 to reduce a power output from the array 720 of light-emitting elements 719. As another example, if the radiation monitor 790 detects a radiation output directly from the lighting device that is less than a threshold radiation output, the controller 714 may send a signal to the coupling electronics 722 of the lighting device 700 to increase a power output from the array 720 of light-emitting elements 719. More accurate and reliable measurement of the radiation output directly from the lighting device 700 with the radiation monitor 790 may be further incorporated to increase an accuracy and reliability of existing control strategies and algorithms of the lighting device 700, as described above. In this way, discrepancies between the radiation output of the lighting device 700 and a threshold or target radiation output from the lighting device 700 may be reduced.

For example, the controller 714 may adjust power source 716 and/or cooling subsystem 718 in response to data received from monitor electronics 792. In one example, a lower than threshold radiation output measured by the radiation monitor 790 for a given power input from power source 716 may indicate that the lighting device 700 may be overheated. In this case, the controller 714 may adjust cooling subsystem 718 to increase a cooling capacity delivered to the light-emitting subsystem 712 to reduce a temperature thereat. In a further example, multiple lighting devices 700 may each include integrated radiation monitors 790 for measuring the radiation output therefrom and for coordinating control of both lighting systems in parallel. For example, controller 714 of multiple lighting systems may operate in a master-slave cascading control algorithm, where the set point of one of the controllers is set by the output of the other controller. Other control strategies for operation of lighting system 10 in conjunction with another lighting system may also be used. In another representation, controller 714 for multiple lighting systems arranged side by side may control lighting systems in an identical manner for increasing uniformity of irradiated light across multiple lighting systems. In one embodiment, one set of monitor electronics 792 may be coupled to multiple pairs of first and second sensors 794 and 798 for communicating with and measuring radiation output from multiple lighting devices 700. In this way, a controller 714 for multiple lighting devices may communicate with a single monitoring electronics 792 for controlling the multiple lighting devices 700, thereby simplifying controller wiring and programming.

Figure 2:
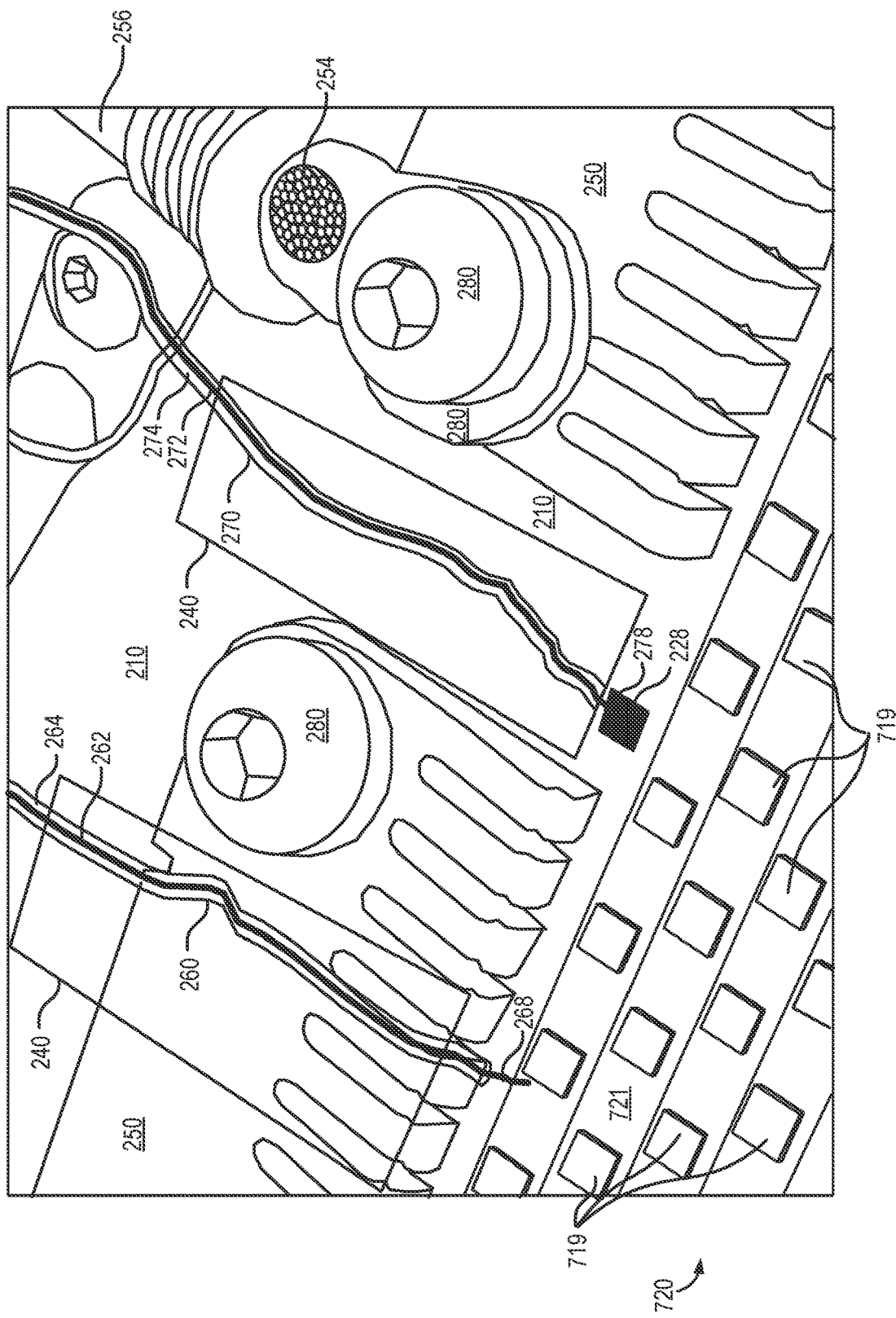
FIG. 2 is a partial perspective view of a first example of a lighting device and sensors of a radiation monitor to monitor output of the lighting device.

Turning now to FIG. 2, it illustrates a partial perspective view 200 of a lighting device, for example lighting device 700 of FIG. 7, retrofitted with a radiation monitor (e.g., radiation monitor 790 of FIG. 7). As shown in FIG. 2, the lighting device includes an array 720 of light-emitting elements 719 conductively coupled to coupling electronics 722 (not shown in FIG. 2) of a light-emitting subsystem 712. Furthermore a controller 714 (not shown in FIG. 2) may be conductively coupled to the coupling electronics 722 for regulating power supplied to the light-emitting subsystem 712. The cooling subsystem 718 may include a plurality of heat sinks 250 and 254 conductively coupled to a printed circuit board (PCB) 210 on which the array 720 of light-emitting elements 719 is mounted. The PCB 210 may include a gold reflective substrate surface layer 721 in the regions surrounding the light-emitting elements 719 that can aid in reflecting stray radiation from external sources towards a direction of the radiant output 724 emitted directly from the light-emitting elements. The various heat sinks 250 and 254 may be mechanically and/or conductive coupled with various fasteners 280 for conducting heat away from the light-emitting subsystem 712 (including the array 720 of light-emitting elements 719) in conjunction. In the example of FIG. 2, heat sinks 250 may include finned conductive solid structures, heat sinks 254 may include insulated (e.g., with insulation 256) cables of conductive wiring, and fasteners 280 may include screws and/or bolts and/or clips for fastening the heat sinks to the printed circuit board 210.

In the example of FIG. 2, the first and second sensors 794 and 798 of radiation monitor 790 may correspond to thermocouples 260 and 270 for measuring radiation (radiant output 724) emitted by the array 720 of light-emitting elements 719. The thermocouples may detect radiant output 724 including radiant light energy emitted from the light-emitting elements 719 of various wavelengths and spectral distributions. Thermocouples 260 and 270 may each comprise conductive thermocouple wires 262 and 272 encapsulated along its length with concentric insulation 264 and 274, respectively. In one example, the first and second thermocouples may include type-T 30-gauge thermocouples; however the type of thermocouples may be selected to match a desired temperature range and size. Utilizing thermocouples as the first and second sensors may be advantageous because they may be more easily integrated or installed in existing lighting devices due to their small size relative photodiodes or other optical sensors. Each of the first and second thermocouples 260 and 270 may include uninsulated bare end sensing portions 268 and 278, respectively, for detecting and measuring infrared radiant output 724 from one or more light-emitting elements 719 of the lighting device 700. The insulation 264 and 274 may serve to thermally and conductively insulate the thermocouple wires 262 and 272 along their length so that signals responsive to a measured radiant output at sensing portions 268 and 278 may be transmitted relatively unhindered to the monitor electronics 790.

Thermocouples 260 and 270 may be positioned to be adjacent, and in close proximity to one or more light-emitting elements 719. In one example the thermocouple 268 may be positioned so that sensing portion 268 may receive radiation output directly from a light-emitting element 719 of the lighting device 700 and external sources (including retro-reflected radiant output) while thermocouple 270 may be positioned so that sensing portion 270 may receive radiation output from external sources without receiving radiation output directly from a light-emitting element 719 of the lighting device 700. External sources of radiation are described above with reference to FIG. 1. Positioning the thermocouple 260 so that sensing portion 268 may receive radiation output directly from a light-emitting element 719 of the lighting device 700 and external sources may include immersing the sensing portion 268 within an emission path of at least one of the light-emitting elements 719 of the lighting device 700, as shown in FIG. 3. In the example of FIG. 2, sensing portion 268 is positioned to overhang at least one of the light-emitting elements 719 so that the sensing portion 268 is immersed within the emission path of the array 720. Immersion of the first sensing portion 268 in the path of the radiation output directly from the light-emitting element may aid in ensuring that the voltage response of the first thermocouple 260 is principally due to the radiation output directly from the light-emitting element.

Furthermore, positioning thermocouple 270 so that sensing portion 270 may receive radiation output from external sources without receiving radiation output directly from a light-emitting element 719 of the lighting device 700 may include shielding the second sensor from the radiation output directly from the light-emitting elements 719. For example, sensing portion 278 of thermocouple 278 may be more recessed away from the array 720 of light-emitting elements 719 relative to the sensing portion 268. In the example of FIG. 2, sensing portion 278 is positioned in a region 228 that is at least laterally recessed away from the array 720 so that radiant output 724 is not directly incident on the sensing portion 278. In other examples, the sensing portion 278 may be positioned to be vertically recessed away from the array 720, or laterally and vertically recessed away from the array 720 so that radiant output 724 emitted directly from the light-emitting elements 719 is not directly incident on the sensing portion 278. Thus, by recessing the second thermocouple away, the second sensing portion 268 may be exposed to radiation from external sources without being exposed to radiation directly output by the lighting device.

Positioning of the thermocouples 260 and 270 may include affixing and/or fastening the thermocouples 260 and 270 to the lighting device 700 by way of a mounting device attached to the thermocouple cladding; however, the thermocouples 260 and 270 may be mounted such that their sensing portions 268 and 278 are not in contact with other solid surfaces so as not to bias the thermocouple measurements of radiation output directly from the light-emitting elements 719 and/or measurement of radiation from external sources. For example, mounting blocks with a fastener may be used to fix a position of the thermocouples 260 and 270 relative to the light-emitting element array 720. In the example of FIG. 2, the mounting device may include adhering transparent adhesive tape 240 to immobilize and/or position the thermocouples 260 and 270 relative to one or more light-emitting elements 719 of the array 720 such that the sensing portion 268 of thermocouple 260 receives radiation output directly from at least one light-emitting element 719 and radiation output from external sources while the sensing portion 278 of second thermocouple 270 receives radiation output from the external sources without receiving the radiation output directly from the light-emitting elements 719 of the lighting device 700. The adhesive tape 240 may include an adhesive that maintains its adhesive properties in high-temperature environments so that the position of the first and second thermocouples 260 and 270 remains reliably fixed during operation of the lighting device 700. The adhesive tape 240 as a mounting device may be advantageous owing to its simplicity for mounting the first and second thermocouples in spatially-constrained environments such as on or in proximity to PCBs. In other examples, other fastening mechanisms for fixing the position of the sensing portion 278 may be utilized, as long as they do not block radiation output from external sources from being received at the second sensor. For example, relatively small thermally-insulative block may serve as a mounting base for supporting and fixing a position of the thermocouples 260 and 270.

Positioning the sensing portion 278 in closer proximity to sensing portion 268 may increase an accuracy of the radiation monitor 790 since the voltage response of the sensing portions 268 and 270 to the radiation from external sources may be more nearly identical. As described previously, vertically recessing the sensing portion 270 relative to sensing portion 268 may facilitate more identical mirroring of the voltage responses of the sensing portions 268 and 270 to the radiation from external sources, in spite of their vertical displacement. Furthermore, electronic circuitry (e.g., monitoring electronics 792) may receive signals output from the first and second thermocouples 260 and 270, and from those signals, determine an intensity of the radiation output directly from the light-emitting elements 719. For example, the electronic circuitry may determine an intensity of the radiation output directly from the light-emitting elements 719 based on a difference in the output signals from the first and second thermocouples 260 and 270, respectively. In this way, the radiation monitor 790 may increase an accuracy and reliability of monitoring radiant output from the lighting device 700.

Referring now to FIG. 3, it illustrates a magnified partial cross-sectional view of lighting device 700, including heat sink 250, light-emitting element 719, and PCB 210 as well as first and second thermocouples 260 and 270. As shown in FIG. 3, the light-emitting element 719 may include a base portion 319 that raises the light-emitting surface 322 from a plane 212 of the PCB 210 so that the light-emitting element 719 emits radiant output 724 at a light-emitting side 312 (indicated by arrow 318) of a light-emitting plane 310. In this way, the light-emitting plane may be roughly parallel but non coplanar with the surface or plane 212 of the PCB 210 facing the base 319. As described above with reference to FIG. 2, adhesive tape 240 (or other fastening means) may be affixed to both the second thermocouple 278 and the surface or plane 212 to position the second sensing portion at a non-light-emitting side 314 of the light-emitting plane 310. In this way, the base 319 in conjunction with the positioning of the second sensor outside of the radiation emission field effectively enables a spatial radiation filter 792 to shield the second sensing portion 278 from radiant output 724 emitted directly from the light-emitting element 719 while allowing the radiation from external sources 328 to reach the second sensing portion 278. In the example of FIG. 3, positioning the second sensor outside of the radiation emission field of the light-emitting element 719 includes positioning the second sensor at the non-light emitting side 314 of the light-emitting plane 310. Although not explicitly shown in FIG. 3, the light-emitting element 719 and light-emitting plane 310 may be raised from the plane 212 of the PCB, and the light-emitting subsystem may include electrical connects (vias, holes, and the like) that conductively connect the light-emitting element 719 to the circuitry electronics of the PCB 210.

The first thermocouple 260 may be positioned adjacent or in close proximity to the light-emitting element 719 so that the sensing portion 268 is positioned at the light-emitting side 312 of the light-emitting plane 310 and is immersed in the path (indicated by radiation rays 324) of the radiant output 724 output directly from the light-emitting element. The radiation rays 324 are typically emitted within an emission field having an upper threshold angle of incidence of ±65 degrees, relative to the axis perpendicular to the light-emitting plane 310. Furthermore, sensing portion 268 may receive incident radiation 328 from external sources, which can include radiant output 724 that is retro-reflected towards the sensing portion 268. The second thermocouple 270 may be shielded from the radiant output 724 by positioning the sensing portion 278 adjacent or in close proximity to the light-emitting element 719 so that the sensing portion 278 is positioned at a non-light-emitting side 314 of the light-emitting plane 310. In this way, the sensing portion 278 is recessed from and shielded from the radiant output 724 output directly from the light-emitting element 719. However, equivalently to sensing portion 268, sensing portion 278 may receive incident radiation 328 from external sources, which can include radiant output 724 that is retro-reflected towards the sensing portion 268.

Accordingly, the sensing portion 278 may receive radiation output 328 from the external sources without receiving the radiant output 724 emitted directly from the light-emitting element 719 while the sensing portion 268 may receive radiation output 328 from the external sources and the radiant output 724 emitted directly from the light-emitting element 719. In other words, the exposure of the first and second thermocouples 260 and 270 to the radiation output 328 from external sources is the same or equivalent. Furthermore, the exposure of the first and second thermocouples 260 and 270 to the radiation output 328 from external sources may be equivalent. Receiving the same or equivalent exposure may include receiving the same radiation spectrum having the same intensity or irradiance at both the first and second sensing portions 268 and 278. Further still, a measure of the actual radiant output 724 emitted directly from the light-emitting element may be determined based on a difference between the signals output from the first and second thermocouples 260 and 270, as discussed below with reference to FIG. 9.

Although FIG. 3 shows the first and second thermocouples positioned adjacent to the same light-emitting element 719, above and below a light-emitting plane, respectively, in other examples, the first and second thermocouples may be positioned adjacent to different light-emitting elements 719 of the array 720, as illustrated in FIG. 2. The first and second thermocouples may be positioned adjacent to different light-emitting elements 719 of the array 720 in cases where the light-emitting elements 719 are equivalent, and/or where exposure of the sensing portions 268 and 278 to radiation output 328 from external sources may be equivalent. In this way, the exposure of the sensing portions 268 and 278 to radiation output 328 from external sources may be equivalent. As such, the radiation output from the lighting device 700 may be determined by the radiation monitor 790 by subtracting the output signal from a second sensor (e.g., the second thermocouple 270 in the example of FIG. 2) from the output signal from a first sensor (e.g., the first thermocouple 260 in the example of FIG. 2).

Turning now to FIG. 4, it illustrates another partial perspective view 400 of lighting device 700 coupled with another example of a radiation monitor 790. In the example of FIG. 4, the radiation monitor 790 includes a first photodiode 460 and a second photodiode 470 corresponding to the first sensor 794 and the second sensor 798, respectively, and first and second light capillaries 410 and 420. The first and second photodiodes 460 and 470 may include an optical coating on their incident radiation-facing surfaces to enhance the responsiveness of the photodiodes to incident radiation over a threshold wavelength range. For example, the threshold wavelength range may be 395 nm+/−5 nm. As another example, the threshold wavelength range may be 365 nm+/−5 nm. The first and/or second light capillaries 410 and 420 may correspond to the radiation filter 792, which may shield the second photodiode 470 from the radiation output directly from the light-emitting element 719 while allowing the radiation from external sources to reach the second photodiode, while the radiation output directly from the light-emitting element 719 and the radiation from external sources are incident at the first photodiode 460.

Conventional solid transmissive light capillaries such as optical fibers, include refractive materials such as polycarbonate, quartz, glass, and the like, so that visible light may be transmitted by way of total internal reflection, thereby mitigating reflective losses, as compared to reflective light capillaries such as those constructed of stainless steel and aluminum. Furthermore, solid transmissive light capillaries including those made of fused quartz and fused silica may transmit UV radiation by way of total internal reflection. However, optical fibers are typically limited in size, having core diameters less than 1 mm, and consequently can have smaller light collection apertures (often less than 20°, depending on the refractive index of the fiber core material relative to the ambient environment and the cladding layers surrounding the optical fiber). Transmissive light capillaries or waveguides are costlier as compared to reflective light capillaries such as metal tubes. Furthermore, mechanical integration of an optical fiber or other transmissive light capillary with a lighting device may be challenging due to the smaller aperture, and lower thermal tolerance (e.g., cladding layers of an optical fiber can degrade when exposed to high irradiance conditions). In contrast, reflective light capillaries, while conventionally utilized for transmitting infrared (IR) radiation where they typically exhibit their highest reflectivity, can afford acceptable reflective and/or spectral losses associated with UV and visible light and in some environments, can enable higher light transmission relative to transmissive light capillaries.

The first and second light capillaries 410 and 420 may each comprise hollow rigid tubes positioned between the array 720 of light-emitting elements 719 and the first and second photodiodes 460 and 470, respectively. Furthermore, the first and second light capillaries 410 and 420 may each include reflective and smooth interior surfaces, including UV-reflective surfaces. In one example, the first and second light capillaries 410 and 420 may each comprise hollow metal tubes, such as stainless steel tubes, aluminum tubes, and the like. In particular, the first and second light capillaries 410 and 420 may each comprise capillary needles, such as 18 gauge metal dispensing needles. Capillary needles are typically stainless steel, and may be procured more easily; however, in the case of UV radiation monitoring, aluminum light capillaries may provide lower reflective losses as radiation is guided along the length of the light capillary to the first or second sensor. Reflective losses associated with the first and second light capillaries 410 and 420 may be mitigated by reducing their overall length relative to conventional reflective light capillaries. Furthermore electronic circuitry may be exploited to amplify output signals from the first and second photodiodes 460 and 470, as further described with reference to FIG. 8. Further still, the ability to manufacture compact reflective light capillaries may be advantageous for their incorporation into small semi-conductor lighting devices. In applications where the amount of radiation (UV, visible light) is very low, and where reflective losses may not be tolerable, transmissive light capillaries may be utilized in the radiation monitor 790.

The first photodiode 460 and the second photodiode 470 may be coupled to the lighting device 700 by way of a mounting means such as mounting block assembly 450. In the example of FIG. 4, the mounting block assembly 450 also supports and positions first and second light capillaries 410 and 420, respectively, relative to the first and second photodiodes 460 and 470, and relative to the light-emitting elements 719. The first and second light capillaries 410 and 420 may each include a first opening (414 and 424, respectively, as shown in FIG. 5) at a first end adjacent to (and more proximal to) and facing toward the first and second photodiodes 460 and 470, respectively, and a second opening (412 and 422, respectively) at a second end adjacent to the array 720 of light-emitting elements 719, more distally located relative to the first and second photodiodes 460 and 470, respectively. The second openings 412 and 422, respectively, may be positioned non-adjacently at the second end and may both face away from the first and second photodiodes 460 and 470, respectively. In this way, the first and second light capillaries may guide radiation, including UV light, incident at the second openings 412 and 422 to the first and second photodiodes 460 and 470, respectively. In other words, UV light incident at the second openings 412 and 422 may be reflected once or multiply from the (UV−) reflective interior surface as it is transmitted along the interior length of the first and second capillaries 410 and 420, respectively, towards the first openings 414 and 424 prior to reaching the first and second photodiodes 460 and 470.

More specifically, the second opening 412 of the first light capillary 410 may be angled to face towards the array 720 of light-emitting elements 719 so that radiation emitted directly from light-emitting elements 719, including light rays 402, may be incident at the second opening 412. Furthermore, radiation from external sources such as external source radiation 408 and retro-reflected radiation 404 from a reflective surface 490, may also be incident at the second opening 412. Accordingly, both radiation emitted directly from radiant output 724 and radiation from external sources, including retro-reflected radiation, may be guided by the first light capillary 410 to the first photodiode 460. In contrast, the second opening 422 of the second light capillary 420 may be angled to face away from the array 720 of light-emitting elements 719 so that radiation emitted directly from the light-emitting elements 719, including light rays 402, will not be incident at the second opening 422. However, as shown in FIG. 4, radiation from external sources such as external source radiation 408 and retro-reflected radiation 404 from a reflective surface 490, may be incident at the second opening 422. Accordingly, the second light capillary 420 may serve as a radiation filter 792, wherein the second light capillary guides radiation from external sources, including retro-reflected radiation to the second photodiode 470, or while excluding radiation emitted directly from the light-emitting elements 719 (including light rays 402) from reaching the second photodiode 470. In this way, the second light capillary may act as a directional radiation filter for excluding the radiation output directly from the light-emitting elements, thereby shielding the second photodiode 470 from the radiation output directly from the light-emitting elements. The first and second light capillaries 410 and 420 may further serve to thermally isolate and shield the first and second photodiodes 460 and 470, respectively, from heat generated at the array 720 of light-emitting elements 719, which may aid in prolonging an operational life of the photodiodes.

Turning now to FIG. 5, it illustrates a magnified perspective view 500 of a partially disassembled mounting block assembly 450, including a mounting block 451 and a sensor-circuitry portion 453. The mounting block assembly may be mechanically coupled to the lighting device by accommodating a fastener such as a screw, bolt, or the like by way of a fastening hole 442. Additionally, non-adhesive bonding techniques may be employed to attach the first and second light capillaries 410 and 420 to the mounting block 451 and to further secure the mounting block 451 to the PCB 210. First and second photodiodes 460 and 470 may electrically integrated with electrical circuitry 494 of a printed circuit board 496 that is mounted on a substrate 454 attached to a mounting plate 456 (shown in FIG. 4). Electrical wiring 480 may be electrically and mechanically coupled to the electrical circuitry 494 and substrate 454, respectively, by way of fasteners 492. The electrical wiring 480 may supply power to and transmit signals from the first and second photodiodes 460 and 470 and electrical circuitry 494. Furthermore, the electrical wiring may be sheathed in an insulated covering, forming a sheathed cable 458.

A radiation barrier 452 may be interposed between the first and second photodiodes 460 and 470 for reducing mixing and/or cross-contamination of radiation (UV or other radiation) from the first light capillary 410 and radiation (UV or other radiation) from the second light capillary 420 prior to reaching the first and second photodiodes 460 and 470, respectively. In other examples, the first and second photodiodes 460 and 470 may be positioned farther away from each other than depicted in FIG. 5, and may or may not be mounted on the same printed circuit board, for example, to accommodate the spatial layout of components in a particular lighting device. Spacing the first and second photodiodes 460 and 470 farther way from each other, and/or mounting them on separate printed circuit boards may also aid in reducing signal mixing or contamination arising from overlap of reflected and incident radiation after exiting the first and second light capillaries and prior to being received at the photodiodes. First and second photodiodes 460 and 470 may further comprise an optical coating for increasing sensitivity and responsiveness of photo-sensors. For example, the first and second photodiodes 460 and 470 may include UV-enhanced photodiodes.

Mounting block assembly 450 further includes a rigid mounting block 451, and may include a light capillary supporting portion 444, a mounting block fastening portion 448, and a sensor mounting portion 446. As shown in FIG. 5, the sensor mounting portion 446 is positioned between and joins the light capillary supporting portion 444 with the mounting block fastening portion 448. Mounting block 451 may be molded or formed from an insulating (electrically non-conductive), rigid material with low thermal conductivity, such as a thermally resistive plastic, to include longitudinal holes (with openings facing toward the first and second photodiodes concentric with first openings 414 and 424) for positioning the first and second light capillaries 410 and 420, fastening hole 442, and a sensor mounting cavity 430 within a photodiode facing surface 428 of the sensor mounting portion 446. One example of a thermally resistive plastic is polyetherimide, such as Ultem.

As shown in FIGS. 4 and 5, the first and second photodiodes 460 and 470 and the radiation barrier 452 may protrude from the surface of the printed circuit board 496 so that when the sensor-circuitry portion 453 is coupled with the mounting block 451, the first and second photodiodes 460 and 470 and the radiation barrier 452 are positioned at least partially in the cavity 430. In this way, the interior surfaces 428 and 427 of the cavity 430 serve as additional barriers to mitigate stray radiation, external from radiation emitted from the first openings 414 and 424, from being incident at the first and second photodiodes 460 and 470, respectively. Furthermore, when the sensor-circuitry portion 453 is assembled and coupled with the mounting block 451, the first and second photodiodes 460 and 470 may be aligned with the first openings 414 and 424, respectively, so that radiation emitted from the first openings 414 and 424 is directly incident to the first and second photodiodes 460 and 470. Accordingly, the first and second light capillaries 410 and 420 may be indirectly coupled to the first and second photodiodes 460 and 470 because the first and second light capillaries 410 and 420 are directly coupled to the mounting block 450, and the photodiodes 460 and 470 are directly coupled to the mounting block 450. Further details regarding the alignment and spacing of the first openings 414 and 424 with the first and second photodiodes 460 and 470 is described below with reference to FIG. 6.

As illustrated in FIG. 13, a cross-sectional area of second openings 412 and 422 may be formed by transversely cutting a cylindrical capillary tube 1310 to form an oblique cross-sectional opening, with a cut direction along an axis (e.g., 1316 and 1318) angled (e.g., 1326 and 1328) from a transverse axis 1314 perpendicular to the longitudinal axis 1312 of the light capillary tube. Furthermore, when the cut direction is along an axis with a more acute angle to the longitudinal axis 1312, a cross-sectional area of the opening may be increased relative to a less acute angle. In this way a cross-sectional area of the openings 1304 and 1306 may be larger than a perpendicular transverse cross-sectional area 1302, such as the cross-sectional area of the first openings 414 and 424, as illustrated in FIG. 5. In this way, an amount of radiation that is incident at the second openings 412 and 422 may be increased as compared to openings having a smaller cross-sectional area.

Moreover, a profile of the opening may be curved (resulting from a curved cutting of the tubular capillary 1310) instead of linear (resulting from a linear cutting of the light capillary), as shown at 1324, to further increase an amount of radiation that is incident at the opening 1304. Furthermore, the longitudinal axis 1312 of the light capillaries 410 and 420 may be parallel or positioned to be angled away from or towards the light-emitting plane 310 or substrate surface layer 721 to further increase or decrease an amount of radiation that is incident at the second openings 412 and 422. Increasing areal collection of incident radiation may increase collection of stray light or radiation from external sources relative to the radiation emitted directly from the light-emitting elements 719; however, by excluding the radiation emitted directly from the light-emitting elements 719 from reaching the second photodiode 470, the incident radiation from external sources may be removed by subtracting the signal output from the second photodiode 470 from the signal output from the first photodiode 460, as discussed below.

As shown in FIGS. 4, 5, and 12, the second openings 412 and 422 may be oriented such that they may be facing in opposite directions. For example, the opening 412 may be facing towards a plane of the array 720 of light-emitting elements 719, while the opening 422 may be facing away from the plane of the array 720 of light-emitting elements 719. In one example, the second openings 412 and 422 may be oriented so that their cross-sections are symmetric about an axis (1212 and 1222) perpendicular to the plane of the array 720 and the PCB 210, as shown in the cross-sectional view 1210. Furthermore, the orientations of the second opening 422 may be positioned at 180 degrees relative the orientation of second opening 412 such that an amount of radiation (724) output directly from the light-emitting elements 719 that is excluded from being incident at the second opening 422 may be increased relative to other orientations, as shown in cross-sectional view 1210. Other orientations of the openings 412 and 422 may be possible. For example, slightly angling the opening 412 so that its axis of symmetry 1212 is angled from being perpendicular to the plane of the array 720 and PCB 210 may aid in increasing capturing incident light from adjacent light-emitting elements, as shown in cross-sectional view 1220. In particular, slightly angling the opening 412 may aid in capturing higher angle incident radiation from neighboring light-emitting elements. Angling of opening 422 so that its axis of symmetry 1222 is angled away from being perpendicular to the plane of the array 720 and PCB 210 may aid in capturing increased amount of high-angle incident light from external sources, including retro-reflected radiation. In another example, angling of opening 422 so that its axis of symmetry 1222 is angled away from being perpendicular to the plane of the array 720 and PCB 210 may allow for radiation 724 directly output from the light-emitting elements 719 to enter the opening 422; hence opening 422 may preferably positioned such that its axis of symmetry 1222 remains perpendicular to the plane of the array 720 and PCB 210.

As described previously, with reference to FIG. 3, the radiation 724 output from the light-emitting elements 719 is typically emitted within an emission field having an upper threshold angle of incidence of ±65 degrees, relative to the axis perpendicular to the light-emitting plane (e.g., ±65 degrees, relative to the axis 1222). In other words, each of the light-emitting elements 719 may have an emission envelope spanning 130 degrees centered about the axis perpendicular to the light-emitting plane. Furthermore, the second light capillary 420 may be positioned so as to be more shallowly spaced apart from the PCB 210 so that radiant output having relatively higher angles of incidence from light-emitting elements 719 positioned laterally farther away from the second light capillary 420 may not be incident at the opening 422.

Increasing a longitudinal length 408 of the light capillaries 410 and 420 may increase an amount of reflective loss imparted to the radiation as it propagates towards the photodiodes 460 and 470, respectively; conversely, decreasing the longitudinal length 408 may reduce the amount of reflective loss. Similarly, increasing a diameter 1311 of the light capillaries 410 and 420 (and cross-sectional area of the openings 412 and 422, respectively) can increase an amount of incident light received thereat, whereas decreasing a diameter 1311 of the light capillaries 410 and 420 (and cross-sectional area of the openings 412 and 422, respectively) can decrease an amount of incident light received thereat. Accordingly the longitudinal length 408 of a light capillary may be selected based on a desired amount of reflective loss that is tolerable for a given amount of incident light at the second opening of the capillary, wherein the amount of incident light at the second opening corresponds to the diameter or cross-sectional area of the capillary. In other words, for larger diameter or larger cross-sectional area light capillaries, a longer light capillary may be tolerable, since the signal strength received at the photodiode may still be high enough after reflective losses. Similarly, a diameter or cross-sectional area of the light capillary may be chosen to yield enough incident light so that enough radiation is received at the photodiode after experiencing the reflective loss corresponding to the length of the capillary. In other words, for shorter light capillaries, smaller diameter (or cross-sectional area) light capillaries may be tolerable, since the signal strength received at the photodiode may still be high enough for a reliably accurate radiation monitoring after reflective losses.

In general, the diameter and length of the light capillary may be selected to yield a signal strength corresponding to a photodiode signal output range of 0 to 5 V for a 0 to 100% intensity range of the lighting device 700. Furthermore, the diameter and length of the light capillary may be selected to yield a target signal strength to noise ratio, with the length of the light capillary influencing signal strength loss (due reflective losses), and the diameter/cross-sectional area of the capillary influencing signal strength (amount of radiation output directly from the light-emitting element incident at the capillary opening) and the amount of noise (amount of stray light incident at the capillary opening). Electronic circuitry parameters may also be adjusted, as described below with reference to FIG. 8, to amplify or reduce the photodiode signal output.

Turning now to FIG. 6, it illustrates comparative schematics 600 and 602 showing the positioning of a light capillary 610, which may correspond to one or more of light capillaries 410 and 420, relative to an incident radiation-facing surface 670 of a photodiode. The incident radiation-facing surface 670 may be elevated from surface of the printed circuit board 496, as shown in FIG. 5, although not depicted as such in FIG. 6, for illustrative purposes. Schematic 600 illustrates positioning of the light capillary 610 relative to the incident radiation-facing surface 670 of the photodiode that results in an overfilled condition. Positioning the light capillary 610 a distance 630 from the incident radiation-facing surface 670 results in a projected path 680 of radiation 624 that exceeds the area of the incident radiation-facing surface 670. For example, a diameter 682 of the projected path 680 of radiation 624 is greater than a diameter 672 of the incident radiation-facing surface 670. As such, changes in radiation intensity received at the light capillary 610 may not be detected by the photodiode, reducing a sensitivity and accuracy of the radiation monitor.

In contrast, schematic 602 illustrates positioning of the light capillary 610 relative to the incident radiation-facing surface 670 of the photodiode that results in an underfilled condition. Positioning the light capillary 610 a distance 640 from the incident radiation-facing surface 670 results in a projected path 686 of radiation 624 that falls within the area of the incident radiation-facing surface 670. For example, a diameter 688 of the projected path 686 of radiation 624 is greater than a diameter 672 of the incident radiation-facing surface 670. In other words the cross-sectional area of radiation subtending the incident radiation-facing surface 670 of the photodiode is smaller than the cross-sectional area of the incident radiation-facing surface 670, itself. As such, changes in radiation intensity received at the light capillary 610 may be detectable and by the photodiode and will result in a corresponding change in the photodiode output signal, thereby increasing a sensitivity and accuracy of the radiation monitor. Furthermore a distance between the light capillary and the incident radiation-facing surface below which an overfilled condition becomes an underfilled condition may be referred to as a threshold distance. Accordingly, when the sensor-circuitry portion 453 is assembled and coupled with the mounting block 451, the projected path of radiation at the incident radiation-facing surface of the photodiode may correspond to an underfilled condition; in other words, a distance between the first opening (e.g., 414 and 424) of a light capillary (410 or 420) and the incident radiation-facing surface of the photodiode (460 or 470) may be less than the threshold distance.

Figure 8:
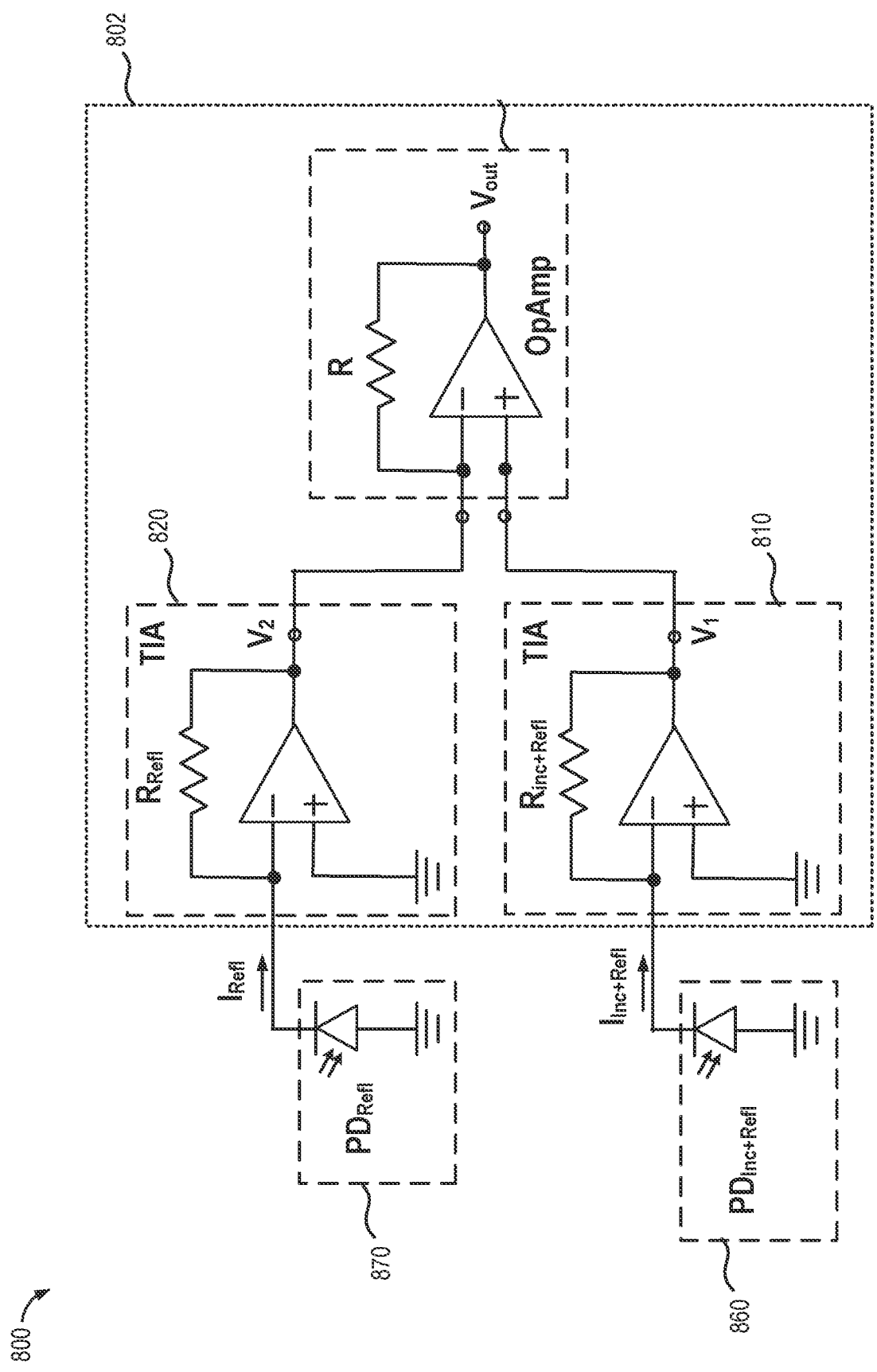
FIGS. 8-9 are example circuit diagrams for the radiation monitors of FIGS. 2 and 4, respectively.

Turning now to FIG. 8, it illustrates a circuit diagram 800 showing operation of monitor electronics 792 for a radiation monitor 790 such as the radiation monitor of FIGS. 4-5. As described above, the radiation monitor collects both incident radiation directly output from the lighting device and radiation from external sources (including retro-reflected radiation) at a first photodiode, $P_{Inc+Refl}$ 860 (corresponding to first photodiode 460), which generates a photocurrent corresponding to their sum, $I_{Inc+Refl}$. Simultaneously, the radiation from external sources without the radiation directly output from the lighting device may be collected and measured at the second diode, $PD_{Refl}$ 870 (corresponding to second photodiode 470), generating a photocurrent, $I_{Refl}$. A differential amplifier circuit 802 may be employed to scale and/or subtract $I_{Refl}$ from $I_{Inc+Refl}$ differentially in order to determine and provide a reliable and accurate direct measure of the radiation output directly from the lighting device. The differential amplifier circuit 802 includes a transimpedance amplifier (TIA) 810 for the $I_{Inc+Refl}$ signal and a separate TIA 820 for the $I_{Refl}$ signal. The TIAs 810 and 820 may convert and amplify the photocurrents, $I_{Inc+Refl}$ and $I_{Refl}$, to voltages $V_1$ and $V_2$ respectively, which are input to a differential amplifier 830.

The differential amplifier 830 determines the difference between the two amplified inputs, $V_1$ and $V_2$, to arrive at the output voltage signal, $V_{out}$. $V_{out}$ thus represents a differential voltage signal corresponding to the measured radiation output directly from the lighting device (radiation from external sources subtracted from the total collected radiation output directly from lighting device and external sources). The resistor, R, may be selected to scale the differential voltage, $V_{out}$, appropriately to correspond to an operational range (e.g., 0-100% of irradiance, power level, or intensity) of the lighting device output. Furthermore resistors, $R_{Inc+Refl}$ and $R_{Refl}$ may be selected appropriately to provide appropriate gain scaling of the voltage signals so that the calculated voltage differences (e.g., $V_{out}=V_1-V_2$ may be resolved by the differential amplifier 830 over a range of photocurrents $I_{Refl}$ and $I_{Inc+Refl}$. The differential amplifier 830 may be mounted on a separate PCB and the TIAs 810 and 820;

alternatively, they may be integrated as part of a larger PCB assembly, for example a light-emitting diode array driver board.

In the absence of radiation from external sources (including retro-reflected radiation), $I_{Inc+Refl}$ would correspond to a nominal current based only on the amount of radiation output directly from the lighting device, and $I_{Refl}$ would nominally be 0, or may include a very small current (approximately 6 orders of magnitude less than Luc) based on its proximity away from the lighting device; $I_{Refl}$ would nominally be 0 since essentially no radiation is incident at (and generating photocurrent) at the second photodiode when no external sources of radiation are present. Thus, the second photodiode response may be negligible.

Gain scaling may be aid in improving the radiation monitor sensitivity because the photocurrent generated by the external source radiation at the second photodiode, $PD_{Refl}$ 870, may be several orders of magnitude less than the photocurrent generated by the radiation directly output by the lighting device at $PD_{Inc+Refl}$ 860. When the radiation from external sources consists essentially of the retro-reflected radiation, the photocurrent $I_{Refl}$ may be on the order of $10^{-6}$ of the value of $I_{Inc+Refl}$ (e.g., $I_{Inc}/I_{Refl}$ is on the order of $10^6$). In one example, $I_{Inc+Refl}$ may be adjusted to establish an upper threshold value of $V_{out}$ to correspond to 4V. Additionally and/or alternatively, the gain may be adjusted on each TIA 910 and 920 independently to achieve an output signal scaled to the corresponding output level of the lighting device. In one example, the gains on the TIAs 910 and 920 may be independently adjusted to achieve a flat output signal scaled to the corresponding output level of the lighting device. In this way, the influence of external radiation on the sensitivity, precision, and accuracy of the radiation monitor in measuring radiation output from a lighting device may be reduced.

Figure 9:
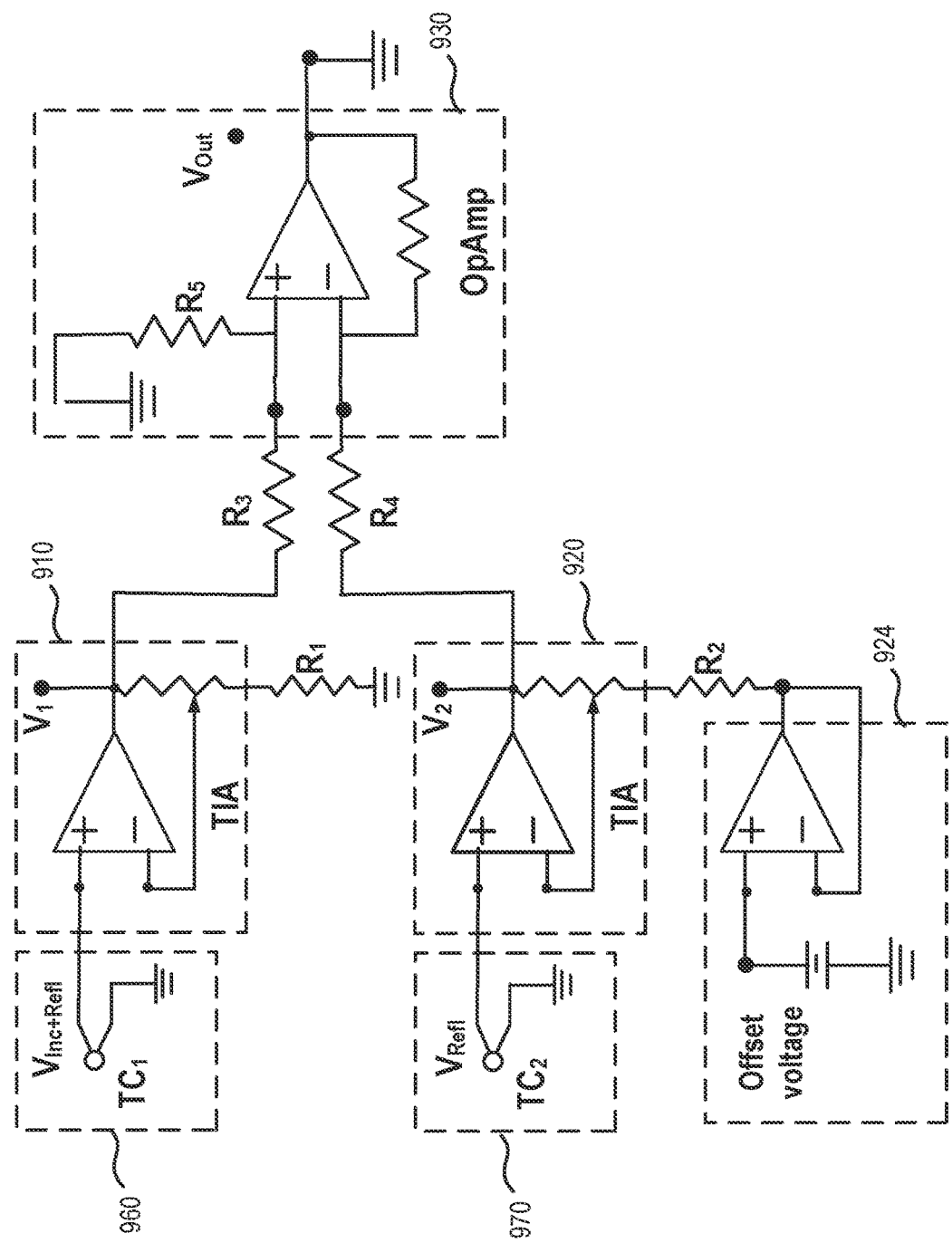

Turning now to FIG. 9, it illustrates a circuit diagram 900 showing operation of monitor electronics 792 for a radiation monitor 790 such as the radiation monitor of FIGS. 2-3. As described above, the radiation monitor collects both incident radiation directly output from the lighting device and radiation from external sources (including retro-reflected radiation) at a first thermocouple, $TC_1$ 960 (corresponding to first thermocouple 260), which generates an input voltage corresponding to their sum, $V_{Inc+Refl}$. Simultaneously, the radiation from external sources without the radiation directly output from the lighting device may be collected and measured at the second thermocouple, $TC_2$ 970 (corresponding to second thermocouple 270), which generates an input voltage, $V_{Refl}$. Accordingly, $V_{Inc+Refl}$ may be proportional to the radiation output directly from the lighting device and the radiation from external sources subtending $TC_1$, while $V_{Refl}$ may be proportional to the radiation from external sources excluding the radiation output directly from the lighting device, subtending $TC_2$.

Similar to the circuit diagram 800, a differential amplifier circuit may be employed to scale and/or subtract $V_{Refl}$ from $V_{Inc+Refl}$ differentially in order to determine and provide a reliable and accurate direct measure of the radiation output directly from the lighting device. TIAs 910 and 920 scale and generate output voltages $V_1$ and $V_2$ corresponding to $V_{Inc+Refl}$ and $V_{Refl}$, respectively. The output voltages $V_1$ and $V_2$ are then input to the differential operational amplifier, OpAmp 930, to determine a net differential voltage signal $V_1-V_2$), which provides a measure of the radiation output directly from the lighting device when no retro-reflective radiation and radiation from other external sources are present. TIAs 910 and 920 may further provide scaling to amplify the input voltages $V_{Inc+Refl}$ and $V_{Refl}$, depending on the amount of temperature change observed at $TC_1$ and $TC_2$ (corresponding to IR radiation generated by the emitted radiation from the lighting device and/or external sources) when the lighting device is operational, and the change in input voltages generated corresponding thereto. For example, resistance values $R_1$ and $R_2$ may be variable and adjustable so that the amount of increase in the output voltages $V_1$ and $V_2$ in the presence of retro-reflective radiation is of similar magnitude for both TIA 910 and TIA 920. In one example, the resistance, $R_1$, may be selected to provide an upper threshold value for $V_1$ of 4V, while the resistance, $R_2$, may be adjusted such that the output signal $V_2$ changes by the same amount as $V_1$ in response to the radiation incident from external sources.

In the absence of radiation from external sources (including retro-reflected radiation), $V_{Inc+Refl}$ would correspond to a nominal voltage based only on the amount of radiation output directly from the lighting device; furthermore, $V_{Refl}$, may still be of similar order of magnitude as $V_{Inc}$ (voltage response at thermocouple due to incident radiation directly output from lighting device) because $TC_1$ and $TC_2$ are both receiving IR radiation from the ambient environment around them irrespective of the lighting device emissions and any external radiation sources. Consequently, the differential voltage signal, $V_1-V_2$, may be small, or less than a few volts. Accordingly, an offset voltage circuit 924 may be included in the monitor electronics 792 for calibrating the radiation monitor by offsetting $V_2$ to zero when radiation from external sources are absent so that $V_2$ may be at a voltage level that is consistent with the radiation from the external sources influencing both thermocouples $TC_1$ and $TC_2$ equivalently, and so that $V_{out}=V_1-V_2$ is determined accurately and reliably over a range of temperatures corresponding to operation of the lighting device 700.

Turning now to FIG. 10, it illustrates voltage response plots 1010 and 1030 for operating a radiation monitor 790 such as the radiation monitor of FIGS. 2-3 and 9. Voltage response plot 1010 includes trend lines for $V_1$ 1012, $V_2$ 1014, and $V_{out}$ 1016, and corresponds to operation of the radiation monitor according to the circuit diagram 900 without the offset voltage circuit 924. Prior to a time of 700 s, no radiation from external light sources is incident at $TC_2$, however $V_2$ 1014 may have a non-zero value between 1 and 1.5 V in response to the local ambient environment (temperature). Between about 700 s to 1000 s, a retro-reflective radiation source is introduced, resulting in a step change in the voltage signals $V_1$ 1012 and $V_2$ 1014. Without the offset voltage circuit 924, in the presence or absence of radiation from external sources, the voltage difference, $V_1-V_2$, may be non-zero, based on the relative proximity of the second sensing portion 278 to the first sensing portion.

In contrast, voltage response plot 1030 corresponds to operation of the radiation monitor according to the circuit diagram 900, including the offset voltage circuit 924. Here, when the radiation from external sources is absent (e.g., prior to 700s and after 1000 s), the offset voltage circuit 924 is adjusted to yield a TIA output voltage $V_2$ 1034 of approximately 0 V in response to the input signal from the second thermocouple 270. As such, the voltage difference, $V_1-V_2$ 1036 (with $V_1$ 1032) output from the radiation monitor 790 may be consistent with a level of radiation from external sources influencing both the first and second thermocouples. Furthermore, prior to 700s and after 1000 s, radiation from external sources is absent, with $V_2 \sim 0V$ and $V_1-V_2$ approximately mirroring the voltage response of $V_1$ resulting from the incident radiation directly output from the lighting device at the first thermocouple. Between ~700 and ~1000 s, radiation from an external source is introduced (e.g., retroreflective media may be positioned ~1 mm away from the first and second photodiodes), causing equivalent step change responses in $V_1$ 1032 and $V_2$ 1034. Because the voltage response to external radiation in $V_2$ and $V_1$ are equivalent, the radiation monitor 790 is able to maintain an accurate and reliable measure of the radiation output directly from the lighting device 700 based on the $V_1-V_2$ 1036, in the presence and absence of the radiation from external sources.

FIG. 10 further illustrates a voltage response plot 1050 for operating a radiation monitor 790 such as the radiation monitor of FIGS. 4-5 and 8, according to the circuit diagram 800, where trend lines represent $V_1$ 1052, $V_2$ 1054, and $V_1-V_2$ 1056. Prior to the time 15 min and after 20 min, no radiation from external sources is present, with $V_2$~0V and $V_1-V_2$ approximately mirroring the voltage response of $V_1$ resulting from the incident radiation directly output from the lighting device at the first photodiode. Between 15 and 20 min, radiation from an external source is introduced, causing equivalent step change responses in $V_1$ 1052 and $V_2$ 1054. In the example of voltage response plot 1050, a highly retroreflective media may be positioned ~1 mm away from the first and second photodiodes, facing the light-emitting array. Because the voltage response to external radiation in $V_2$ and $V_1$ are equivalent, the radiation monitor 790 is able to maintain an accurate and reliable measure of the radiation output directly from the lighting device 700 based on the $V_1-V_2$ 1056, in the presence and absence of the radiation from external sources. Thus, little deviation from steady-state is observed in the radiation monitor's signal $V_1-V_2$, even in the presence of the retroreflective media, thereby maintaining a higher signal-to-noise ratio as compared with conventional radiation monitors.

In this manner, a radiation monitor for a lighting device may comprise a first sensor receiving radiation output directly from a light-emitting element of the lighting device and radiation output from external sources, a second sensor receiving the radiation output from the external sources without receiving the radiation output directly from the light-emitting element of the lighting device; and electronic circuitry receiving output signals from the first sensor and the second sensor and determining an intensity of the radiation output directly from the light-emitting element based on a difference in the output signals from the first sensor and the second sensor. A second example of the radiation monitor optionally includes the first example and further includes a radiation filter shielding the second sensor from the radiation output directly from the light-emitting element, while allowing the radiation from the external sources to reach the second sensor. A third example of the radiation monitor optionally includes one or more of the first and second examples, and further includes wherein the first sensor and the second sensor comprise thermocouples. A fourth example of the radiation monitor optionally includes one or more of the first through third examples, and further includes wherein the second sensor is positioned at a non-light-emitting side of a light-emitting plane of the light-emitting element. A fifth example of the radiation monitor optionally includes one or more of the first through fourth examples, and further includes wherein the radiation filter comprises the light-emitting element emitting radiation at a light-emitting side of the light-emitting plane, and the second sensor positioned at the non-light-emitting side of the light-emitting plane. A sixth example of the radiation monitor optionally includes one or more of the first through fifth examples, and further includes wherein the first sensor is immersed within an emission path of the light-emitting element and positioned at the light-emitting side of the light-emitting plane. A seventh example of the radiation monitor optionally includes one or more of the first through sixth examples, and further includes wherein the first sensor and the second sensor comprise photodiodes. An eighth example of the radiation monitor optionally includes one or more of the first through seventh examples, and further includes wherein the radiation filter comprises, a second light capillary, wherein a first opening of the second light capillary is positioned adjacent to and facing the second sensor, and wherein a second opening of the second light capillary faces away from the light-emitting element. A ninth example of the radiation monitor optionally includes one or more of the first through eighth examples, and further includes wherein the radiation filter comprises a first light capillary coupled to the first sensor at a first end of the first light capillary, the first light capillary including a first opening at a second end of the first light capillary, wherein the first opening faces towards the light-emitting element.

In a first example, a radiation monitoring system for a lighting device may comprise a first sensor and a second sensor positioned adjacent to a light-emitting element of a lighting device, wherein the first sensor receives radiation output directly from the light-emitting element and radiation output from external sources, the second sensor receives the radiation output from the external sources while shielded from the radiation output directly from the light-emitting element, wherein exposure of the first sensor and the second sensor to the radiation output from the external sources is equivalent, and electronic circuitry receiving output signals from the first sensor and the second sensor and calculating an intensity of the radiation output directly from the light-emitting element based on a difference in the output signals from the first sensor and the second sensor. A second example of the radiation monitoring system optionally includes the first example and further includes wherein the electronic circuitry is conductively coupled with the lighting device. A third example of the radiation monitoring system optionally includes one or more of the first and second examples, and further includes wherein the intensity of the radiation output directly from the light-emitting element is modulated in response to the intensity of the radiation output directly from the light-emitting element calculated by the electronic circuitry.

Turning now to FIG. 11, it shows a flow chart for a method 1100 of operating a radiation monitor 790, such as the radiation monitor of FIGS. 2-5. One or more of the individual steps of method 1100 may be performed as executable instructions on-board a computer controller, such as a controller for a lighting device, or a device external from the lighting device. Method 1100 begins at 1110 where electronic circuitry of the radiation monitor may be coupled to a lighting device. Conductively coupling the electronic circuitry of the radiation monitor to the lighting device may include coupling the monitor electronics 792 with the coupling electronics 722 of a lighting device 700. Furthermore, the monitor electronics 792 may be conductively coupled to the controller 714 of the lighting device 700. In this way, the operation of the lighting device 700 may be adjusted responsively to an output signal from the radiation monitor 790. For example, if the radiation monitor 790 indicates that radiation output directly from the lighting device 700 is above or below a threshold value by more than a threshold difference, the controller 714 may adjust a power supplied to the light-emitting subsystem 712 from power source 716 to reduce or increase the radiation output from the lighting device 700, respectively.

In another example, if the power supplied to the light-emitting subsystem 712 for generating a threshold amount of radiation output directly from the lighting device 700 (e.g., as measured by the radiation monitor 790) is greater than a threshold power level, then the controller 714 may increase cooling supplied from the cooling subsystem 718 to the light-emitting subsystem, or may indicate a faulty light-emitting element. Accordingly, by conductively coupling the monitor electronics 792 to the lighting device 700, the operation of the lighting device 700 and the radiation monitor 790 may be more closely integrated. In cases, where the electronic circuitry of the radiation monitor 790 is not conductively coupled to the lighting device 700, the radiation monitor 790 may operate as a standalone measuring device, or may output radiation measurements to a separate computer.

Next, at 1120, method 1100 may include positioning a first and second sensor adjacent to a light-emitting element of the lighting device. As described above, the first and second sensor may include thermocouples, photodiodes, or other types of photosensors. The first and second sensors may be equivalent sensors with respect to type, size, construction, and the like, so that a differential output signal from the first and second sensors may aid in determining an amount of radiation output directly from the light-emitting element. Furthermore, the first and second sensor may be positioned adjacent to the same light-emitting element; alternately, the first and second sensor may be positioned adjacent to different but equivalent (e.g., equivalent intensity, size, power, and the like) light-emitting elements in a light-emitting element array. Positioning the first and second sensor adjacent to the light-emitting element may include positioning the sensors such that the radiation monitor may determine an amount of radiation output directly from the light-emitting element as well as an amount of radiation output from external sources, including retro-reflected radiation.

At 1130, method 1100 may include receiving radiation output directly from the light-emitting element at the first sensor. For example, a first thermocouple 760 may be positioned so that a sensing portion 768 is immersed within a path of the radiation output from the light-emitting element. In another example, a first photodiode 460 may be positioned in conjunction with a light capillary to guide radiation output directly from the light-emitting element to a photosensitive surface of the first photodiode 460. Next, at 1140, method 1100 may include receiving radiation output from external sources (including retro-reflected radiation) at the first sensor and the second sensor. In one example, the first sensor and the second sensor may be positioned relative to the lighting device and relative to the external sources such that radiation output from external sources received at the first sensor and the second sensor may be equivalent.

At 1150, method 1100 may include shielding the second sensor from radiation output directly from the light-emitting element of the lighting device. As shown in FIG. 11, shielding the second sensor from radiation output directly from the light-emitting element may include recessing the second sensor away from a light-emitting side 312 of the light-emitting element 719. In this way, recessing and shielding the second sensor may serve to filter the radiation output directly from the light-emitting element from reaching the second sensor. Furthermore, shielding the second sensor from radiation output directly from the light-emitting element may include positioning a first light capillary adjacent to the second sensor and positioning a second light capillary adjacent to the first sensor. The second light capillary may allow radiation output directly from the lighting device and radiation output from external sources to be received at the first sensor. Simultaneously, the first light capillary may serve as a radiation filter to guide radiation output from the external sources to the second sensor while excluding radiation output directly from the lighting device. In this way, radiation output directly from the lighting device and radiation output from external sources may be received and measured by the first sensor, while radiation output from external sources may be received and measured by the second sensor while excluding radiation output directly from the lighting device.

Next at 1160, method 1100 may include calculating radiation output from the lighting device from a difference in output signals from the first and second sensors. For example, the output signal from the first sensor may represent an amount of radiation output directly from the light-emitting element and an amount of radiation output from the external sources, while the output signal from the second sensor may represent an amount of radiation output from the external sources while excluding the amount of radiation output directly from the light-emitting element. By subtracting the signal output from the second sensor from the signal output from the first sensor, contribution of the radiation output from external sources on the measured output signal from the first sensor can be negated, thereby producing a more reliable and accurate measure of the radiation output directly from the light-emitting element.

At 1170, method 1100 may determine if the calculated radiation output, as determined by the radiation monitor from the output signal of the first sensor, is above or below a threshold radiation output by more than a threshold difference. If the calculated radiation output differs from the threshold radiation output by more than a threshold difference, method 1100 continues at 1180 where the controller of the lighting device may adjust operation of the lighting device to reduce the difference between the calculated radiation output and the threshold radiation output. Adjusting operation of the lighting device to reduce the difference between the calculated radiation output and the threshold radiation output may include one or more of modulating power input, cooling capacity, and the like to the lighting device For the case where the calculated radiation output differs from the threshold radiation output by less than a threshold difference, method 1100 continues at 1172 where the controller of the lighting device may maintain operation (e.g., maintain power input, cooling, and the like) to the lighting device. After 1172 and 1180, method 1100 ends.

In this manner, the technical result of accurate and reliable monitoring of a light source is provided. In particular, the influence incident radiation arising from external sources is removed by subtracting its contribution from the measured radiation. Furthermore, the radiation monitor can be implemented and customized to a particular lighting device or application by utilizing different types of radiation sensors. Further still, the radiation monitoring is provided without paired light sources. In this way, costs and complexity of the radiation monitor can be reduced, while increasing its reliability and accuracy as compared with conventional devices.

Accordingly, in one example, a method of measuring radiation output from a lighting device may comprise positioning a first sensor and a second sensor adjacent to a light-emitting element of the lighting device, and receiving radiation output directly from the light-emitting element at the first sensor, while shielding the second sensor from the radiation output directly from the light-emitting element, and while receiving radiation output from external sources at the first sensor and the second sensor. In such an example, additionally or alternatively, an equivalent amount of the radiation output from the external sources may be received at both the first sensor and the second. Furthermore, receiving the radiation output from the external sources may additionally or alternatively include receiving retro-reflected radiation from the light-emitting element. In some examples, the method may additionally or alternatively comprise determining the radiation output from the lighting device by subtracting an output signal from the second sensor from an output signal from the first sensor. Furthermore, in some examples, shielding the second sensor from the radiation output directly from the light-emitting element may additionally or alternatively include recessing the second sensor away from a light-emitting side of a light-emitting plane of the light-emitting element, wherein the light-emitting element outputs radiation from the light-emitting plane at the light-emitting side. The method may additionally or alternatively comprise positioning a first light capillary adjacent to the second sensor, wherein shielding the second sensor from the radiation output directly from the light-emitting element includes orienting an opening of the first light capillary away from the light-emitting element thereby guiding the radiation from the external sources to the second sensor while excluding the radiation output directly from the light-emitting element. In another example, the method may additionally or alternatively comprise positioning a second light capillary adjacent to the first sensor, the second light capillary guiding the radiation from the external sources and the radiation output directly from the light-emitting element to the first sensor. In any of the preceding examples, determining the radiation output from the lighting-emitting element further may additionally or alternatively comprise outputting the output signal from the second sensor, the output signal from the second sensor corresponding to an intensity of the radiation output from the external sources, without corresponding to the intensity of the radiation output directly from the light-emitting element.

Note that the example control and estimation routines included herein can be used with various lighting sources and lighting system configurations. The control methods and routines disclosed herein may be stored as executable instructions on-board a controller in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to various Lambertian or near-Lambertian light sources. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A lighting system comprising:
a plurality of lighting devices, each having a light-emitting element and a corresponding pair of sensors, a first sensor of each pair of sensors receiving radiation output directly from the corresponding light-emitting element and radiation output from external sources, and a second sensor of each pair of sensors receiving radiation output from external sources without receiving radiation output directly from the corresponding light-emitting element;
electronic circuitry to determine an intensity of radiation output directly from the light-emitting element of each of the lighting devices, based on a difference in output signals from the corresponding pair of sensors; and
a controller controlling the plurality of lighting devices in an identical manner.

2. The method of claim 1, wherein the plurality of lighting devices are arranged side by side.

3. The method of claim 1, wherein a single array of light-emitting elements includes the light-emitting elements of the plurality of lighting devices.

4. The method of claim 3, wherein the array of light-emitting elements is a linear array.

5. The method of claim 1, further comprising:
a plurality of radiation filters respectively corresponding with the pairs of sensors, the radiation filters shielding the second sensors of each pair of sensors from radiation output directly from the corresponding light-emitting elements, and the radiation filters allowing radiation from external sources to reach the second sensors of each pair of sensors.

6. The method of claim 5, wherein the second sensor of each pair of sensors is positioned at a non-light-emitting side of a light-emitting plane of the corresponding light-emitting element.

7. The method of claim 6, wherein the corresponding light-emitting element is operable to emit radiation at a light-emitting side of the corresponding light-emitting plane.

8. The method of claim 7, wherein the first sensor of each pair of sensors is immersed within an emission path of the corresponding light-emitting element and is positioned at the light-emitting side of the corresponding light-emitting plane.

9. The method of claim 5, wherein the first sensor and the second sensor of each pair of sensors comprise one of: a thermocouple, and a photodiode.

10. The method of claim 5, wherein each radiation filter comprises a light capillary, wherein a first opening of each light capillary is positioned adjacent to and facing the corresponding second sensor, and wherein a second opening of each light capillary faces away from the corresponding light-emitting element.

11. The method of claim 10, wherein each radiation filter comprises an additional light capillary coupled to the corresponding first sensor at a first end of the additional light capillary, and wherein each additional light capillary includes a first opening at a second end of the additional light capillary, the first opening facing towards the corresponding light-emitting element.

12. A method of controlling radiation for a lighting system, the method comprising:
- positioning each of a plurality of pairs of sensors adjacent to a respectively corresponding light-emitting element of a plurality of lighting devices;
- for a first sensor of each pair of sensors, receiving radiation output directly from the corresponding light-emitting element and radiation output from external sources;
- for a second sensor of each pair of sensors, shielding the second sensor from radiation output directly from the corresponding light-emitting element while receiving radiation output from external sources; and
- controlling the plurality of lighting devices in an identical manner.

13. The method of claim 12, wherein the plurality of lighting devices are arranged side by side.

14. The method of claim 13, wherein a single array of light-emitting elements includes the light-emitting elements of the plurality of lighting devices.

15. The method of claim 12, wherein an equivalent amount of radiation output from external sources is received at the first sensor and the second sensor of each pair of sensors.

16. The method of claim 12, further comprising:
- determining a radiation output from each lighting device by subtracting an output signal from the corresponding second sensor from an output signal from the corresponding first sensor.

17. The method of claim 16, wherein determining the radiation output from each lighting device further comprises:
- outputting the output signal from the corresponding second sensor, the output signal from the second sensor corresponding to an intensity of the radiation output from the external sources, without corresponding to the intensity of the radiation output directly from the light-emitting element.

18. An enhanced-uniformity lighting system, comprising:
- a first lighting device having a first light-emitting element and a first pair of sensors, a first sensor of the first pair of sensors receiving radiation output directly from a first light-emitting element and radiation output from external sources, and a second sensor of the first pair of sensors receiving radiation output from the external sources without receiving the radiation output directly from the first light-emitting element;
- a second lighting device having a second light-emitting element and a second pair of sensors, a first sensor of the second pair of sensors receiving radiation output directly from a second light-emitting element and radiation output from external sources, and a second sensor of the second pair of sensors receiving radiation output from the external sources without receiving the radiation output directly from the second light-emitting element;
- electronic circuitry to determine a first intensity of radiation output directly from the first light-emitting element based on a difference in output signals from the first pair of sensors, and to determine a second intensity of radiation output directly from second first light-emitting element based on a difference in output signals from the second pair of sensors; and
- a controller for the first lighting device and the second lighting device, the controller controlling the first lighting device and the second lighting device in an identical manner.

19. The enhanced-uniformity lighting system of claim 18, wherein the first lighting device and the second lighting device are arranged side by side; and wherein a single array of light-emitting elements includes the first light-emitting element and the second light-emitting element.

20. The enhanced-uniformity lighting system of claim 18, wherein the first intensity of radiation is modulated in response to the intensity of the radiation output directly from the first light-emitting element; and wherein the second intensity of radiation is modulated in response to the intensity of the radiation output directly from the second light-emitting element.

* * * * *